United States Patent
Morisawa et al.

(10) Patent No.: US 6,334,498 B1
(45) Date of Patent: Jan. 1, 2002

(54) HYBRID VEHICLE

(75) Inventors: Kunio Morisawa, Toyota; Tatsuya Ozeki, Okazaki, both of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/619,656

(22) Filed: Jul. 19, 2000

Related U.S. Application Data

(62) Division of application No. 09/396,723, filed on Sep. 15, 1999, now Pat. No. 6,119,799, which is a division of application No. 08/841,392, filed on Apr. 30, 1997, now Pat. No. 5,984,034.

(30) Foreign Application Priority Data

May 2, 1996 (JP) ............................... 8-135774

(51) Int. Cl.$^7$ ................................. B60K 1/00
(52) U.S. Cl. ..................................... 180/65.2
(58) Field of Search ................ 180/65.2, 297, 180/65.7, 65.3, 65.4, 165, 197, 65.1; 303/152

(56) References Cited

U.S. PATENT DOCUMENTS

| | | | |
|---|---|---|---|
| 3,749,197 A | * 7/1973 | Deutsch ..................... 180/169 |
| 4,073,359 A | * 2/1978 | Fujiki et al. ................ 180/169 |
| 4,095,665 A | 6/1978 | Armfield | |
| 4,335,429 A | 6/1982 | Kawakatsu | |
| 5,251,680 A | * 10/1993 | Minezawa et al. .......... 180/169 |
| 5,318,141 A | 6/1994 | Bates et al. | |
| 5,368,120 A | 11/1994 | Sakai et al. | |
| 5,697,466 A | 12/1997 | Moroto et al. | |
| 5,713,425 A | * 2/1998 | Buschhaus et al. ........ 180/65.2 |
| 5,755,302 A | 5/1998 | Lutz et al. | |
| 5,775,449 A | 7/1998 | Moroto et al. | |
| 5,788,597 A | 8/1998 | Boll et al. | |
| 5,823,280 A | 10/1998 | Lateur et al. | |
| 5,839,535 A | 11/1998 | Arai | |
| 5,842,534 A | 12/1998 | Frank | |
| 5,846,155 A | 12/1998 | Taniguchi et al. | |
| 5,915,801 A | * 6/1999 | Taga et al. ................... 303/152 |
| 5,979,257 A | * 11/1999 | Lawrie ................... 180/65.2 X |
| 5,984,034 A | 11/1999 | Morisawa et al. | |
| 5,993,350 A | * 11/1999 | Lawrie et al. ......... 180/65.2 X |
| 6,059,064 A | 5/2000 | Nagano et al. | |

FOREIGN PATENT DOCUMENTS

| | | |
|---|---|---|
| FR | 2 661 141 | 10/1991 |
| JP | 63-203430 | 8/1988 |
| JP | 3-159502 | 7/1991 |
| JP | 4-243627 | 8/1992 |
| JP | 7-186748 | 7/1995 |
| JP | 7-231508 | 8/1995 |
| WO | WO 92/20544 | 11/1992 |

* cited by examiner

Primary Examiner—Robert J. Oberleitner
Assistant Examiner—Melanie Torres
(74) Attorney, Agent, or Firm—Oblon, Spivak, McClelland, Maier & Neustadt, P.C.

(57) ABSTRACT

A hybrid vehicle having an engine and a motor to be controlled independently of each other for running the vehicle. This hybrid vehicle is given a braking demand detecting function to detect a braking demand through an idle ON of the engine while the vehicle is running, and a first braking function to suppress the rise in the vehicle speed of the vehicle by a regenerative braking force of the motor if the braking demand is detected by the braking demand detecting function.

2 Claims, 26 Drawing Sheets

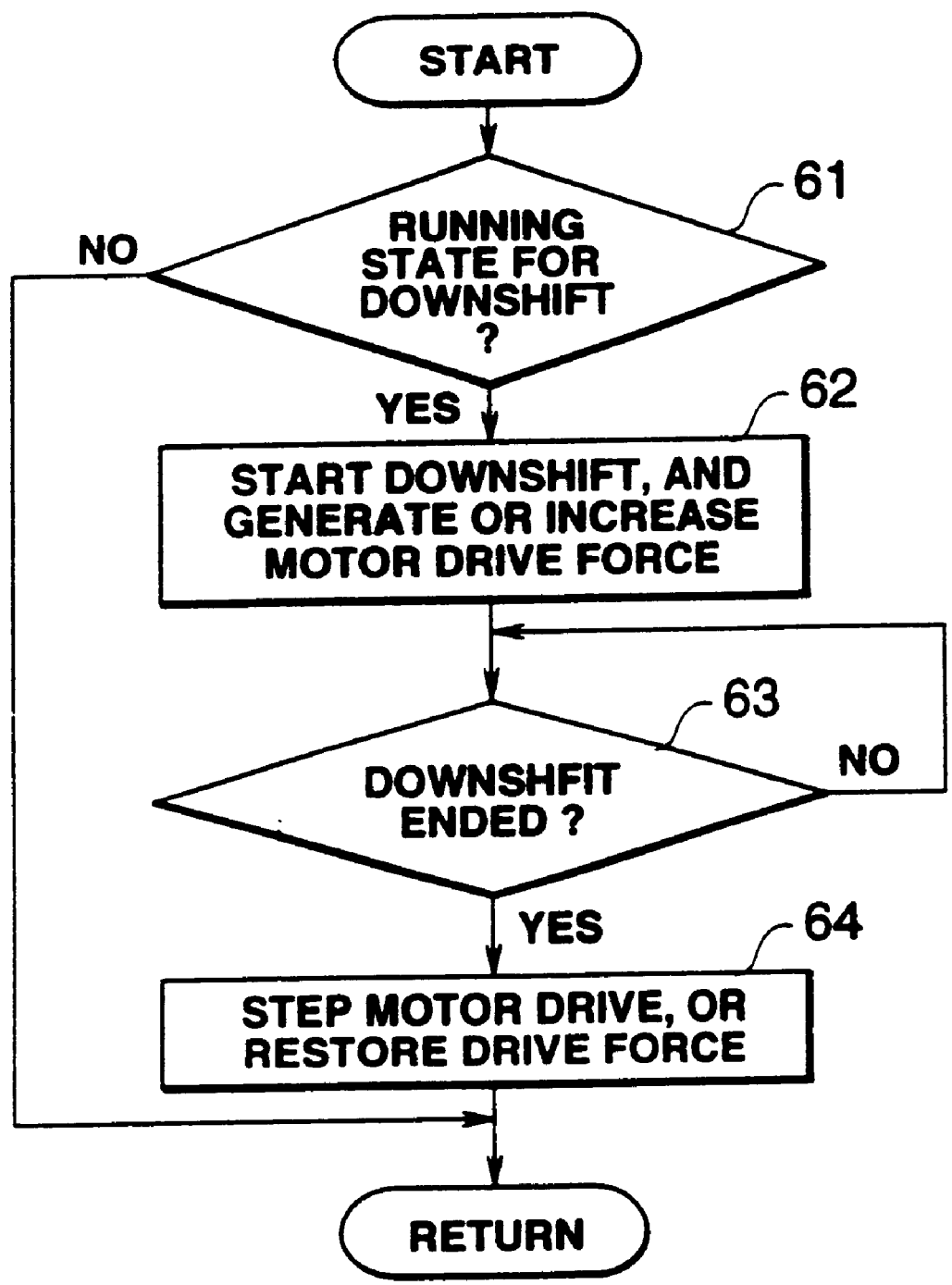

HYBRID VEHICLE

This application is a Division of Ser. No. 09/396,723 filed Sep. 15, 1999 now U.S. Pat. No. 6,119,799 which is a Division of Ser. No. 08/841,392 filed Apr. 30, 1997, now U.S. Pat. No. 5,984,034.

BACKGROUND OF THE INVENTION

1. Field of the Invention

The present invention relates to a hybrid vehicle equipped with a plurality of prime movers for running the vehicle.

2. Related Art

In the prior art, there have been developed a hybrid vehicle which is intended to improve an overall efficiency by combining a plurality of prime movers while exploiting the merits and compensating the demerits of the individual prime movers. One example of this hybrid vehicle is disclosed in JPA-7-186748.

The hybrid vehicle, as disclosed, is equipped with an engine and a motor-generator as the prime movers. The motor-generator is given a power running function to convert an electric energy into a kinetic energy, and a regenerative function to establish a regenerative braking force by converting a kinetic energy into an electric energy.

Moreover, the hybrid vehicle is constructed such that the drive force of the engine is transmitted either the front wheels or the rear wheels whereas the drive force of the motor-generator is transmitted to the wheels to which is not transmitted the drive force of the engine.

On the other hand, this hybrid vehicle is equipped with a controller for controlling its running state. To this controller, there are inputted a variety of signals for indexing the running state, such as the RPM of the engine, the throttle opening, the steering angle, the stroke of depression of the brake, the stroke of depression of the accelerator pedal or the gear position. The motor-generator is controlled by this controller on the basis of those signals.

In a straight running state or a running state at a small steering angle of the hybrid vehicle, for example, the drive force at an acceleration or the braking force at a deceleration is detected. Moreover, a shortage of the drive force, if detected, is assisted with the drive force of the motor-generator. On the other hand, a shortage of the braking force, if detected, is assisted with the regenerative braking force of the motor-generator.

However, what is done by the hybrid vehicle disclosed in the aforementioned Laid-Open is only to assist the shortage of the drive force of the engine or the braking force of the vehicle by the motor-generator. In short, no consideration is taken into the transient situation which accompanies the changes in the acting states of the engine and the transmission connected to the engine. Therefore, it cannot be said that the output of the motor-generator, as used in parallel with the engine, functions sufficiently for all the various situations that will occur from the start to the end of the run of the vehicle. This exerts a restriction upon the improvements in the running performance, the drivability or the riding comfort.

SUMMARY OF THE INVENTION

A main object of the present invention is to provide a hybrid vehicle which can exploit, during one prime mover is active, the output of another prime mover effectively as the drive force or braking force of the vehicle on the basis of the change in the active state of the active prime mover or a power transmission unit connected to the former.

According to a hybrid vehicle having a first characteristic construction of the present invention, if a braking demand in an idling state of a first prime mover such as an engine is detected while the vehicle is running, the braking force is assisted with the regenerative braking force of a second prime mover such as a motor-generator thereby to suppress the rise in the vehicle speed. As a result, the braking operation by the driver and its frequency are decreased to improve the braking performance and the drivability.

According to a hybrid vehicle having a second characteristic construction of the present invention, if an obstruction around the vehicle is detected, the vehicle is suppressed from approaching the obstruction by the regenerative braking force of the second prime mover such as the motor-generator. As a result, the braking operation by the driver and its frequency are decreased to improve the braking performance and the drivability.

According to a hybrid vehicle having a third characteristic construction of the present invention, if the distance between the vehicle of the driver and another preceding vehicle is shortened, the braking force of the own vehicle is increased to hold the distance between vehicles constant by the regenerative braking force of the second prime mover such as the motor-generator. As a result, the braking operation by the driver and its frequency are decreased to improve the braking performance and the drivability.

According to a hybrid vehicle having a fourth characteristic construction of the present invention, if the vehicle is run by the output torque of one prime mover amplified by a torque converter, the output of another prime mover is added to the drive force of the vehicle on the basis of the torque of the output member of the torque converter. As a result, the transient change in the drive force, as based on the action of the torque converter, is assisted with the output of another prime mover to improve the running performance and the drivability.

According to a hybrid vehicle having a fifth characteristic construction of the present invention, the output of another active prime mover is added to the drive force of the vehicle during a downshift of an automatic transmission. As a result, the transient change in the drive force according to the change in the output torque of the automatic transmission is assisted with the output of another prime mover to improve the acceleration responsiveness of the vehicle thereby to improve the running performance and the drivability.

According to a hybrid vehicle having a sixth characteristic construction of the present invention, if a speed changing frequency of the automatic transmission exceeds a predetermined value, the output of another active prime mover is added to the drive force of the vehicle. In short, the running state of the vehicle makes it difficult to change the speed of the automatic transmission. As a result, the vibration due to the frequent speed change of the automatic transmission, i.e., the hunting is prevented to improve the riding comfort and the drivability.

According to a hybrid vehicle having a seventh characteristic construction of the present invention, the output of another prime mover is added to the drive force of the vehicle during the upshift of the automatic transmission. As a result, the transient change in the drive force due to the upshift of the automatic transmission can be suppressed to prevent the shift shock thereby to improve the riding comfort, the running performance and the drivability.

According to a hybrid vehicle having an eighth characteristic construction of the present invention, if a speed change of a transmission is detected, the output of another prime mover is added to the drive force of the vehicle. As a result, the transient change in the drive force due to the speed change of the transmission can be suppressed to prevent the shift shock thereby to improve the riding comfort, the running performance and the drivability.

According to a hybrid vehicle having a ninth characteristic construction of the present invention, if the change in the drive force of the vehicle is detected by the speed change of the transmission, the changing range of the drive force of the vehicle is suppressed by the output of another prime mover. As a result, the transient change in the drive force due to the speed change of the transmission can be suppressed to improve the riding comfort, the running performance and the drivability.

According to a hybrid vehicle having a tenth characteristic construction of the present invention, if a demand for increasing the drive force of the vehicle is detected with an input member and an output member being connected by a lockup clutch, the output of another prime mover is added to the drive force of the vehicle. As a result, it is simultaneously possible to keep the torque transmission efficiency by the coupling of the lockup clutch, to prevent the vibration and to improve the accelerating ability, thereby to improve the running performance, the riding comfort and the drivability.

According to a hybrid vehicle having an eleventh characteristic construction of the present invention, if a demand for stopping the vehicle is detected during an idling of a first prime mover such as the engine, the creep torque, as outputted from a starting unit, is suppressed by the regenerative braking force of a second prime mover such as the motor-generator. As a result, the braking operation by the driver and its frequency are decreased to improve the braking performance and the drivability.

According to a hybrid vehicle having a twelfth characteristic construction of the present invention, if the driver is inattentive even when the driver's intention is to move the vehicle gradually forward or backward, an alarm is raised to stop the inattention. As a result, the braking operation by the driver and its frequency are reduced to improve the braking performance and the drivability.

According to a hybrid vehicle having a thirteenth characteristic construction of the present invention, if it is detected while the vehicle is run by the output of one prime mover that the prime mover is changed from a shut state to a fed-state of the fuel, the output of another prime mover is added to the drive force of the vehicle. As a result, the shortage of the drive force of the vehicle due to a delay in the exposition timing of the prime mover in the fed state of the fuel is assisted with the output of another prime mover so that the transient accelerating ability is improved to improve the running performance and the drivability.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 12 is a flow chart showing another control example of the hybrid vehicle of the present invention;

DETAILED DESCRIPTION OF THE PREFERRED EMBODIMENTS

Figure 1:
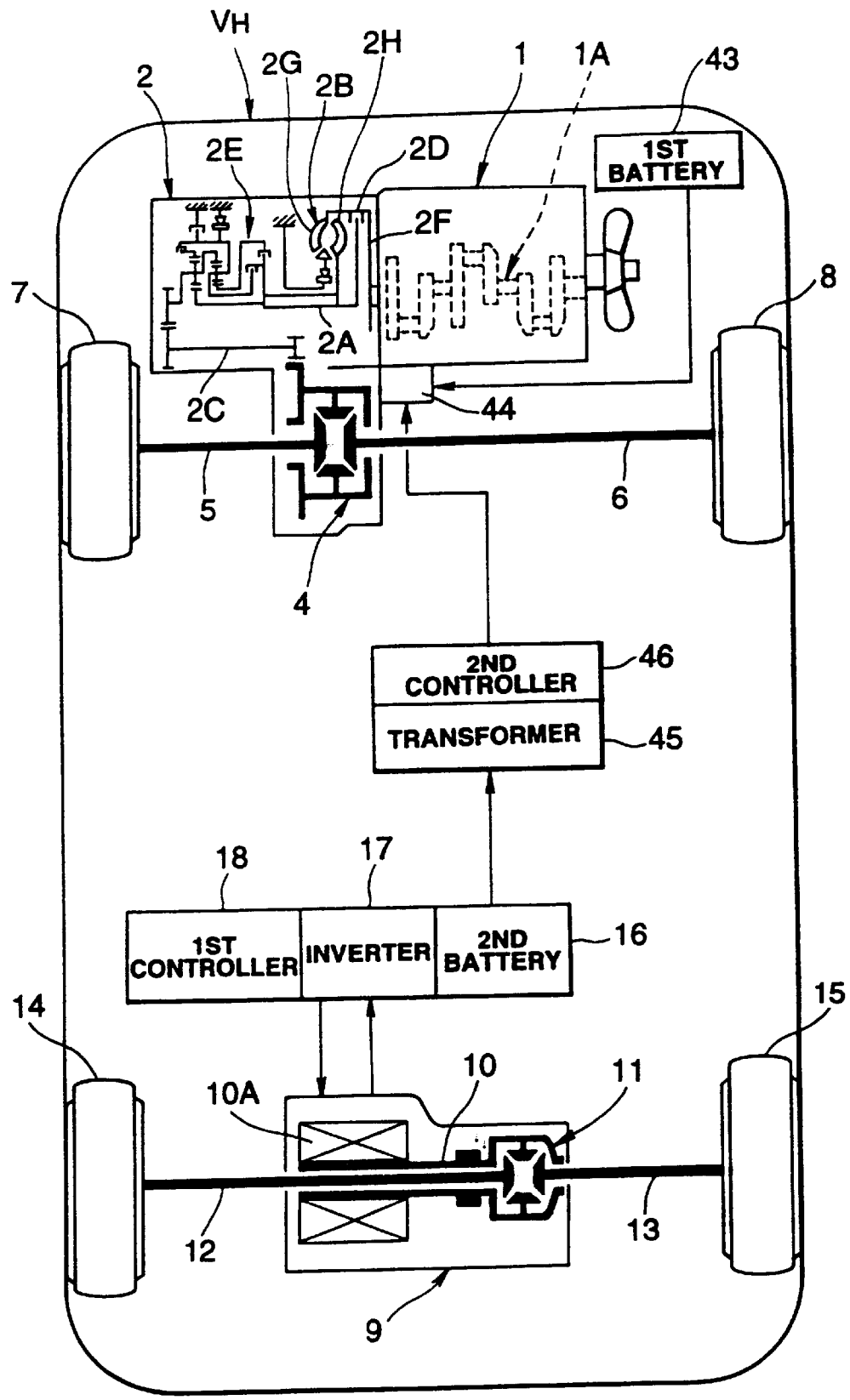
FIG. 1 is a conceptional diagram showing a schematic construction of a hybrid vehicle of the present invention.

The present invention will be described in detail with reference to the accompanying drawings. FIG. 1 is a schematic top plan view showing the entire construction of a hybrid vehicle HV of the present invention. On the front portion of this hybrid vehicle HV, as shown in FIG. 1, there is mounted an engine 1. This engine 1 corresponds to the prime mover of the present invention. The engine 1 can be exemplified by an internal combustion engine such as a gasoline engine, a diesel engine or an LPG engine. The engine 1 is provided with the well-known construction which includes an intake pipe, a combustion chamber, a piston, a cylinder, a fuel system, an electric system, a cooling system and a lubricating system (although non of them is shown).

Moreover, the engine 1 can be exemplified by a variable cylinder engine capable of controlling all or some of the cylinders into fuel fed or blocked states. Still moreover, the engine 1 can be exemplified by a bank switching engine which is equipped with a righthand bank and a lefthand bank so that the fuel fed and blocked states can be switched for each bank.

To the rear end of the crankshaft 1A of the engine 1, on the other hand, there is attached to the not-shown flywheel. By the power supply from a first battery 43, moreover, a starting motor 44 is activated to start the flywheel initially. In the engine 1, the thermal energy, as produced by the explosion of the fuel fed to the combustion chamber, is converted into a kinetic energy, i.e, the reciprocating motions of the piston. These reciprocations of the piston are converted into the rotational motions of the crankshaft 1A.

In the present embodiment, there is adopted the so-called "transverse engine" type in which the crankshaft 1A is arranged generally perpendicular to the running direction of the hybrid vehicle HV. The aforementioned intake pipe is equipped with a throttle valve to be actuated by the accelerator pedal, and a sub-throttle valve positioned upstream of the throttle valve and to be actuated by another actuator independently of the action of the accelerator pedal. This sub-throttle valve is opened/closed according to the running state of the vehicle so that it can control the power ON/OFF of the engine 1 automatically.

At the output side of and in alignment with the engine 1, moreover, there is arranged an automatic transmission 2. This automatic transmission 2 has the wellknown construction of the so-called "transverse type", in which the output torque of the engine 1 is inputted through a torque converter 2B to a gear speed change unit 2E composed mainly of a planetary gear mechanism. The aforementioned torque converter 2B corresponds to the starting unit of the present invention.

The torque converter 2B is composed of a front cover 2F connected to the flywheel of the engine 1, a pump impeller 2G attached to the front cover 2F, a turbine runner 2H attached to the later-described intermediate shaft, and a lockup clutch 2D for interlocking the front cover 2F and the intermediate shaft mechanically. The front cover 2F or the pump impeller 2G corresponds to the input member of the present invention, and the turbine runner 2H corresponds to the output member of the present invention.

On the other hand, the gear speed change unit 2E is caused to execute speed changes by applying/releasing the frictional engagement elements such as clutches and/or brakes, and is equipped with an intermediate shaft 2A and a counter shaft 2C arranged in parallel with the intermediate shaft 2A. As a result, the torque, as inputted from the engine 1 to the automatic transmission 2, is decelerated or accelerated by the gear speed change unit 2E and then outputted from the counter shaft 2C to a differential unit 4. Moreover, front wheels 7 and 8 are attached to drive shafts 5 and 6 which are connected to the differential unit 4. These drive shafts 5 and 6 are arranged generally in parallel with the engine 1 and the automatic transmission 2.

On the rear portion of the hybrid vehicle HV, on the other hand, there is mounted a motor-generator 9. This motor-generator 9 corresponds to the prime mover of the present invention. The motor-generator 9 is given a regenerative function to generate a regenerative braking force by converting a mechanical energy into an electric energy, and a power running function to convert an electric energy into a mechanical energy. This motor-generator 9 has the well-known construction composed of a hollow output shaft 10, a coil 10A wound on the outer circumference of the output shaft 10, a (not-shown) magnet arranged around the coil 10A. Moreover, the output shaft 10 is connected to a well-known differential mechanism 11, and rear wheels 14 and 15 are attached to drive shafts 12 and 13 which are connected to the differential mechanism 11.

On the hybrid vehicle HV, there is also mounted a second battery 16, the output DC current of which is converted into an AC current by an inverter 17. This AC current is fed to the motor-generator 9 to activate it. Incidentally, these motor-generator 9 and inverter 17 are controlled by a first controller 18. Moreover, the second battery 16 is connected with the starting motor 44 through a transformer 45 and a second controller 46. As a result, the DC current of the second battery 16 could be subjected to a voltage transformation and supplied to the starting motor 44.

Figure 2:
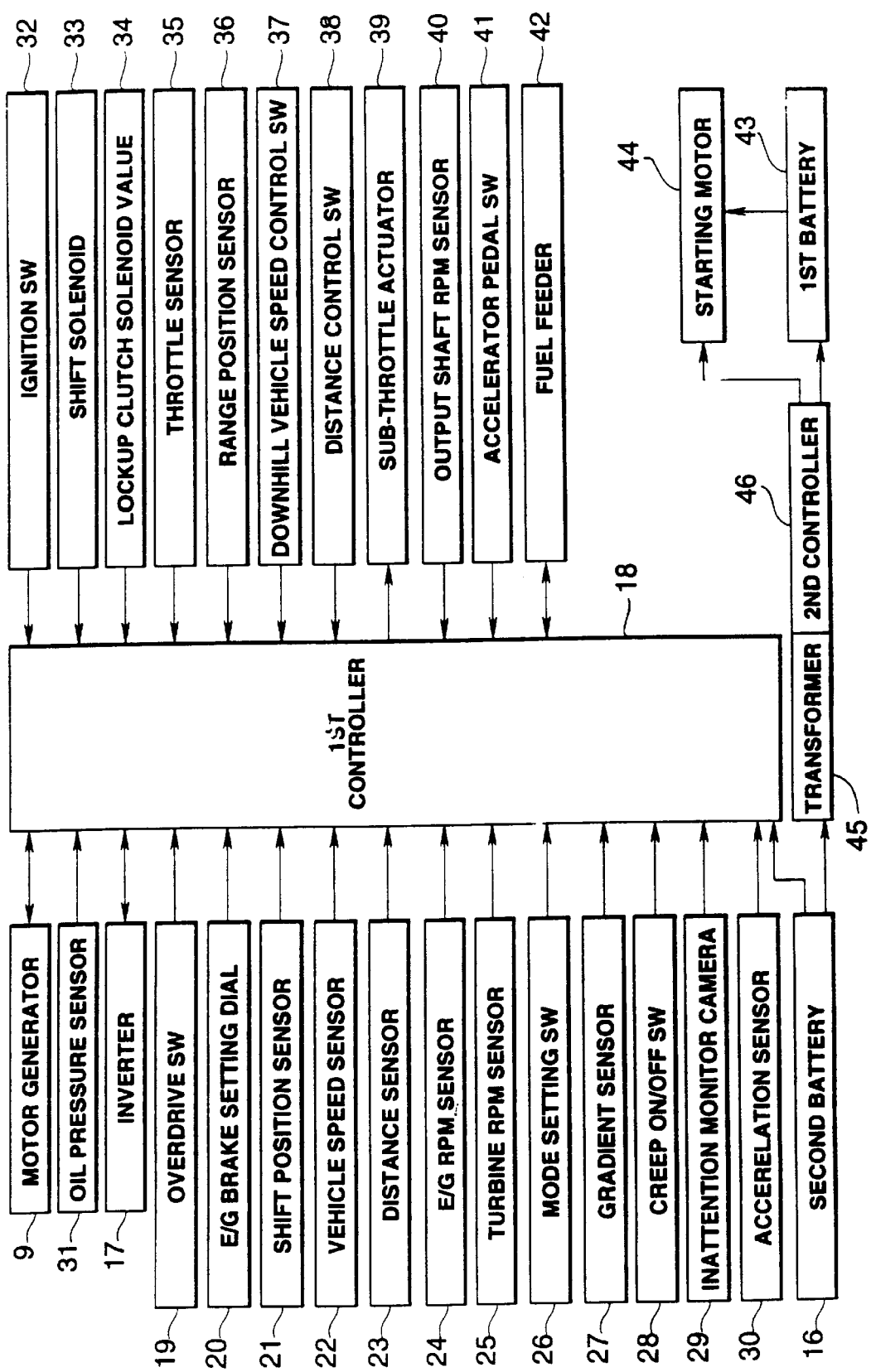
FIG. 2 is a block diagram showing a control circuit for the hybrid vehicle of the present invention.

FIG. 2 is a block diagram showing a main control circuit of the aforementioned hybrid vehicle HV. The aforementioned first controller 18 is constructed of a microcomputer which is equipped with a central processing unit, a memory unit and an input/output interface. The central processing unit is exemplified by a CPU or MPU, and the memory unit is exemplified by a ROM and a RAM.

To the first controller 18, moreover, there are inputted: the ON/OFF signal of an overdrive switch 19 for making the RPM of the counter shaft 2C of the automatic transmission 2 higher than that of the crankshaft 1A of the engine 1; the signal of an engine braking setting dial 20 for setting the engine braking force of the engine 1; and the signal of a shift position sensor 21 for detecting a shift position (or a gear stage) of the automatic transmission 2.

Further inputted to the first controller 18 are: the signal of a vehicle speed sensor 22 for detecting the vehicle speed; the signal of a distance between vehicles sensor (distance sensor) 23 for detecting the distance or room between the vehicle being run by the driver and a preceding or following vehicle; the signal of an engine RPM sensor 24 for detecting the RPM of the crankshaft 1A of the engine 1; and the signal of a turbine RPM sensor 25 for detecting the RPM of the turbine runner 2H.

Further inputted to the first controller 18 are: the signal of a mode setting switch 26 to be switched by the manual operation of the driver or automatically according to the state of the vehicle; the signal of a gradient sensor 27 for detecting the gradient of a road; the signal of a creep ON/OFF switch 28 for turning ON/OFF the creep torque to establish the drive force of the vehicle by the torque amplification of the torque converter 2B; and the signal of an inattention monitor camera 29 for monitoring an inattention of the driver.

Further inputted to the first controller 18 are: the signal of an acceleration sensor 30 for detecting the longitudinal acceleration of the hybrid vehicle HV; the signal of an oil pressure sensor 31 for detecting the oil pressure of a (not-shown) servo actuator to actuate the frictional engagement elements of the automatic transmission 2; the signal of an ignition switch 32, as outputted by the driver's operation of the ignition key; the signal of a throttle sensor 35 for detecting the throttle valve opening of the engine 1; and the signal of a range position sensor 36 for detecting a range of the automatic transmission 2, as selected by the driver.

Further inputted to the first controller 18 are: the signal of a downhill vehicle speed control switch 37 for controlling the vehicle speed at a downhill run; the signal of a distance between vehicles control switch (distance control switch) 38 for keeping the distance between the vehicle and a preceding or following vehicle at a constant value; the signal of an output shaft RPM sensor 40 for detecting the RPM of the counter shaft 2C of the automatic transmission 2; and the signal of an accelerator pedal switch 41 for detecting the depression stroke of the accelerator pedal.

From the first controller 18, on the other hand, there are outputted signals for controlling: a shift solenoid valve 33 for controlling the application/release of the frictional engagement elements of the automatic transmission 2; a lockup clutch solenoid valve 34 for controlling the application/release of the lockup clutch 2D; and the inverter 17 for converting the DC current into the AC current.

Further outputted from the first controller 18 are signals for controlling: the motor-generator 9; a sub-throttle valve actuator 39 for opening/closing a sub-throttle valve disposed in the intake pipe of the engine 1; and a fuel feeder 42 for feeding the fuel to the combustion chamber of the engine 1. The drive force or the regenerative braking force of the motor-generator 9 is adjusted with the value of the current supplied from the second battery 16.

The running states of the aforementioned hybrid vehicle HV are detected on the basis of the various signals inputted to the first controller 18. On the basis of these detected running states, moreover, the engine 1, the motor-generator 9 or the automatic transmission 2 is controlled. The aforementioned running mode is set by switching the mode setting switch 26 to any of a normal mode, an economy mode, a power mode, a snow mode, a sport mode or an emergent escape mode.

In order to decide the running state of the vehicle, the first controller 18 is stored with reference data including the vehicle speed, the engine braking force, the throttle opening, the distance between vehicles or the output torque of the automatic transmission 2. Further stored in the first controller 18 are data for controlling the power running function or regenerative function of the motor-generator 9 in accordance with the running mode or state. Specifically, there are stored the regenerative braking force according to each gear stage of the automatic transmission 2, the regenerative braking force or drive force according to the change in the torque of the counter shaft 2C, the drive force according to the demand for the vehicle to increase it, and the drive force according to the RPM of the engine 1 at the time of a change from the fuel blocked state to the fuel fed state.

Further stocked in the first controller 18 is a shift diagram for controlling the gear stages of the automatic transmission 2 and the application/release of the lockup clutch 2D. This shift diagram uses the opening of the throttle valve of the engine 1 and the vehicle speed as its indexes and is set with a downshift curve for determining a downshift point of the automatic transmission 2, an upshift curve for determining an upshift point of the automatic transmission 2, and a lockup curve for controlling the application/release of the lockup clutch 2D.

This shift diagram is changed according to the running mode which is set by the mode setting switch 26. For example, the shift diagram for the economy mode is more apt to use a higher gear stage than in the shift diagram for the normal mode. In other words, a run stressing the fuel economy can be achieved if the economy mode is selected while the hybrid vehicle HV is running on an expressway.

On the other hand, the shift diagram for the power mode has a content that a lower gear stage is more easily used than the shift diagram for the normal mode. Specifically, if the power mode is selected while the hybrid vehicle HV is running in a mountainous country, the power performance is enhanced, and the engine braking force is effective so that the drivability is improved.

Moreover, the shift diagram corresponding to the snow mode has a content that the second speed is set at the start of the hybrid vehicle HV. Specifically, if the snow mode is selected when the hybrid vehicle HV is started on a road having a low coefficient of friction, the driving force of the vehicle is suppressed to prevent the slippage of the drive wheels thereby to improve the steering stability of-the vehicle.

Incidentally, the sport mode is one for changing the gear stages of the automatic transmission 2 by the manual shift of the driver and does not employ the aforementioned shift diagrams.

Thus, the shift diagrams can be changed on the basis of the running modes by a method, in which a reference shift diagram is corrected by the operational processing, or by a method in which different kinds of shift diagrams are stored in advance so that they may be interchanged.

The hybrid vehicle HV thus constructed is run by the drive force, as outputted from at least one of the engine 1 and the motor-generator 9. The drive force of the engine 1 is transmitted to the front wheels 7 and 8 through the automatic transmission 2, the differential unit 4 and the drive shafts 5 and 6.

On the other hand, the drive force of the motor-generator 9 is transmitted to the rear wheels 14 and 15 through the output shaft 10, the differential mechanism 11 and the drive shafts 12 and 13. Moreover, the controls to be performed are to stop one of the engine 1 and the motor-generator 9 in accordance with the selected running mode or state and to cause the motor-generator 9 to function as a power generator at the deceleration of the hybrid vehicle HV. When the motor-generator 9 functions as the power generator, the inertial energy is converted into the electric energy to establish the regenerative braking force. Here, the electric energy, as generated by the regenerative braking of the motor-generator 9, is stored in the second battery 16.

The hybrid vehicle HV having the aforementioned hardware construction has the following various characteristic components.

A first characteristic construction includes: braking demand detecting means for detecting a braking demand in the idling state of the engine 1 while the vehicle is running; and first braking means for suppressing the rise of the vehicle speed, if the braking demand is detected by the braking demand detecting means, by the regenerative braking force of the motor-generator 9.

A second characteristic construction includes: obstruction detecting means for detecting an obstruction around the vehicle while the engine 1 is active; and second braking means for establishing the regenerative braking force of the motor-generator 9 in a direction to prevent the vehicle from approaching the obstruction if this obstruction is detected by the obstruction detecting means.

According to a third characteristic construction, in addition to the second characteristic construction, the obstruction detecting means detects another vehicle running ahead of the vehicle of the driver so that the second braking means controls the regenerative braking force of the motor-generator 9 on the basis of the distance between the own vehicle and that another vehicle.

A fourth characteristic construction includes: output torque estimating means for estimating the torque of the turbine runner 2H; and first control means for adding the output of the motor-generator 9 to the vehicle drive force on the basis of the torque of the turbine runner 2H, as estimated by the output torque estimating means.

A fifth characteristic construction includes: downshift detecting means for detecting a downshift by the automatic transmission 2; and second control means for adding the output of the motor-generator 9 to the vehicle drive force during the downshift.

A sixth characteristic construction includes: speed changing frequency detecting means for detecting the speed changing frequency by the automatic transmission 2; and third control means for adding an output of the prime mover other than that connected to the automatic transmission 2, to the vehicle drive force if the speed changing frequency detected by the speed changing frequency detecting means is over a predetermined value.

A seventh characteristic construction includes: upshift detecting means for detecting an upshift by the automatic transmission 2; and fourth control means for adding the output of the motor-generator 9 to the vehicle drive force during the upshift.

An eighth characteristic construction includes: speed change detecting means for detecting a speed change by the automatic transmission 2; and fifth control means for adding the output of the motor-generator 9 to the drive force of the vehicle, if a speed change is detected by the speed change detecting means, on the basis of the output torque of the automatic transmission 2 at a changed gear stage.

A ninth characteristic construction includes: first detect means for detecting that the vehicle drive force changes according to a speed change of the automatic transmission 2; and sixth control means for controlling the output of the motor-generator 9 in a direction to suppress the changing width of the vehicle drive force if a change in the vehicle drive force is detected by the first detect means.

A tenth characteristic construction includes: second detect means for detecting that the lockup clutch 2D is applied; increase demand detecting means for detecting a demand for an increase in the vehicle drive force; and seventh control means for adding the output of the motor-generator 9 to the vehicle drive force if the demand for the increase in the drive force is detected with the lockup clutch 2D being applied.

An eleventh characteristic construction includes: stop demand detecting means for detecting a demand for stopping the vehicle with the engine 1 being in the idling state; and third braking means for establishing the regenerative braking force of the motor-generator 9 in a direction to suppress a creep torque to be outputted from the torque converter 2B, if a stop demand is detected by the stop demand detecting means.

According to a twelfth characteristic construction, in addition to the eleventh characteristic construction, an alarm for stopping an inattention of the driver is outputted by the third braking means if it is detected by the stop demand detecting means that the driver is inattentive.

A thirteenth characteristic construction includes: fuel detecting means for detecting the change of the engine from the fuel blocked state to the fuel fed state; and eighth control means for adding the output of the motor-generator 9 to the vehicle drive force if it is detected by the fuel detecting means that the engine 1 is changed from the fuel blocked state to the fuel fed state.

Here will be specifically described control examples of the hybrid vehicle HV, as corresponding to the aforementioned first to thirteenth characteristic constructions.

(First Control Example)

A control example corresponding to the first characteristic construction will be described with reference to the flow chart of FIG. 3. First of all, while the hybrid vehicle HV is running, it is decided (at Step 1) by the first controller 18 whether or not the range position of the automatic transmission 2 is in a D (drive) range. If the answer of Step 1 is "YES", it is decided (at Step 2) by the first controller 18 whether or not the automatic transmission 2 is shifted up to the highest gear stage, that is, whether or not the vehicle is running at a high speed.

If the answer of Step 2 is "YES", it is decided (at Step 3) by the first controller 18 whether or not the throttle valve opening of the engine 1 (as will be shortly referred to the "throttle opening") θ is 0, that is, whether or not the power is OFF (in the idling state). If the answer of Step 3 is "YES", it is meant that the driver has an intention to decelerate the vehicle so that the engine braking force is established according to the intention in the engine 1. It is then decided (at Step 4) by the first controller 18 whether or not the vehicle speed is increasing.

If the answer of Step 4 is "YES", the hybrid vehicle HV is downhill on a slope having a large gradient so that it cannot be decelerated by the prevailing engine braking force thereby to fail to satisfy the intention of the driver. As a result, the regenerative braking is started by the motor-generator 9 so that the rise in the vehicle speed of the hybrid vehicle HV is suppressed (at Step 5) by the regenerative braking force. Moreover, the vehicle speed $V_0$ at the start of the regenerative braking is stored in the first controller 18. Incidentally, the control is made to increase the regenerative braking force if the regenerative braking has already been done by the motor-generator 9.

After a predetermined time period has elapsed from the start of the regenerative braking, a control is made to confirm validity of the regenerative braking force. Specifically, the vehicle speed V of the hybrid vehicle HV is detected by the first controller 18, and it is decided (at Step 6) whether or not the vehicle speed V is increased to exceed the vehicle speed $V_0$ at the start of the regenerative braking. If the answer of Step 6 is "NO", it is decided (at Step 7) whether or not the vehicle speed V is below the vehicle speed $V_0$ after a predetermined time period. If the answer of Step 7 is "YES", that is, if the road comes into a situation in which the gradient becomes relatively gentle, the regenerative braking by the motor-generator 9 is ended (at Step 8).

If any of the answers of Steps 1 to 4 is "NO" because the vehicle speed is decelerated on a flat road, for example, the regenerative braking by the motor-generator 9 is not executed, but the routine is returned. If the answer of Step 6 is "YES" or if the answer of Step 7 is "NO", the vehicle is running on such a steep downhill that the regenerative braking force started at Step 5 is insufficient, the routine is returned to Step 5, at which the control is made to increase the regenerative braking force.

Steps 1 to 4 correspond to the braking demand detecting means of the present invention, and Steps 5 to 7 correspond to the first control means of the present invention. Incidentally, the vehicle speed $V_0$ to be set at Step 5 can be changed to either a deceleration side or an acceleration side in accordance with the magnitude of the engine braking force being established.

Figure 3:
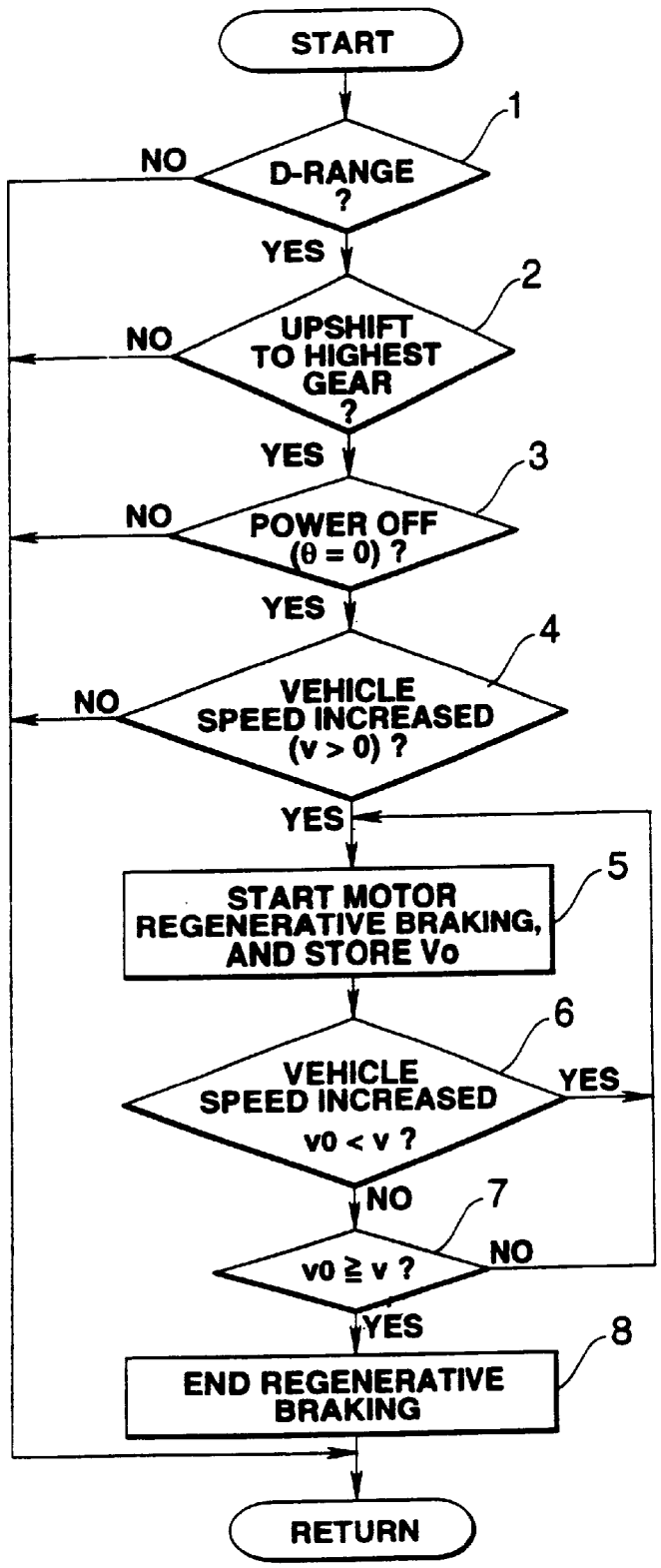
FIG. 3 is a flow chart showing a control example of the hybrid vehicle of the present invention.

Thus, according to the control example of FIG. 3, if the engine 1 comes during the running of the hybrid vehicle HV into the idling state and if the engine braking force is established so that the braking demand is detected, the engine braking force is assisted by the regenerative braking force of the motor-generator 9 so that the rise in the vehicle speed is suppressed. Even for a downhill on a slope, therefore, the braking operation by the driver and its frequency are decreased to improve the braking performance and the drivability.

(Second Control Example)

Figure 4:
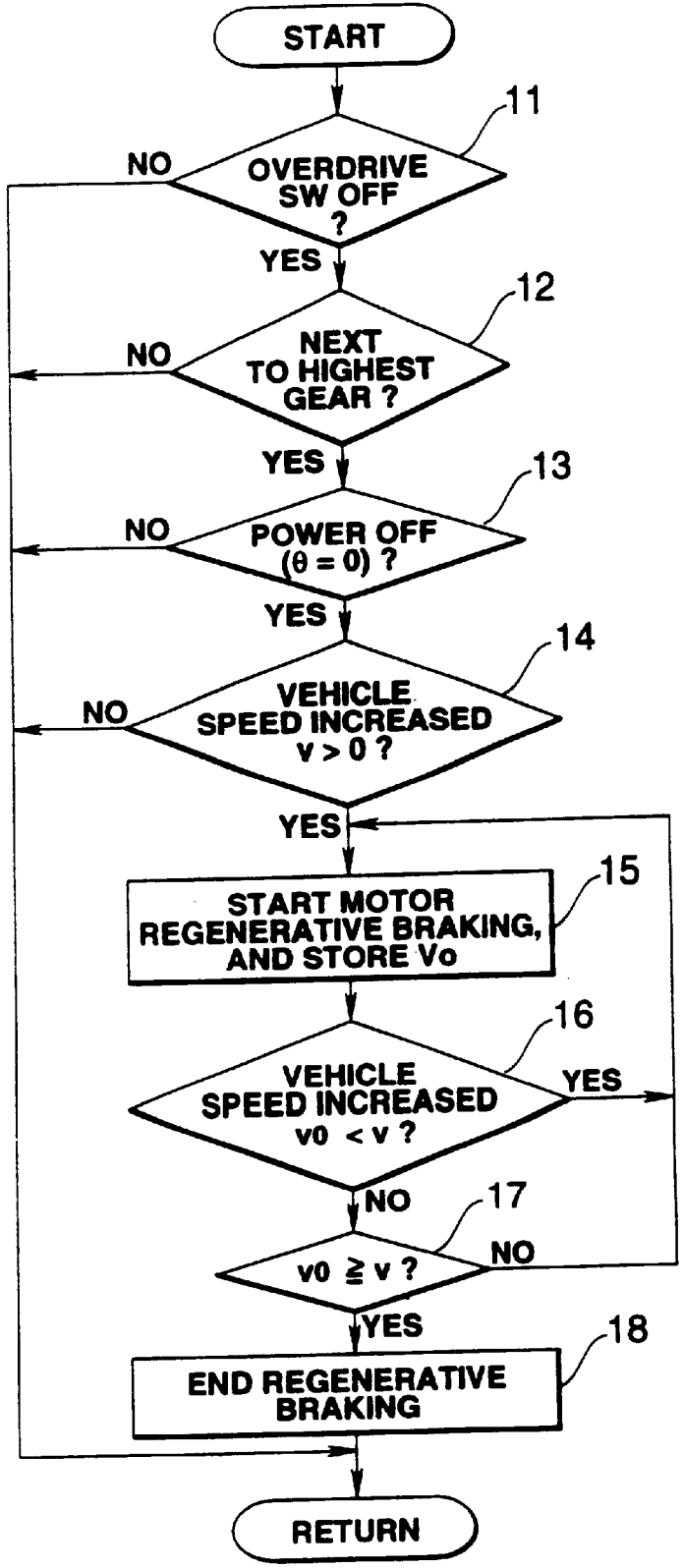
FIG. 4 is a flow chart showing another control example of the hybrid vehicle of the present invention.

FIG. 4 is a flow chart showing another control example corresponding to the first characteristic construction. First of all, while the hybrid vehicle HV is running, it is decided (at Step 11) by the first controller 18 whether or not the overdrive switch 19 is OFF. If the answer of Step 11 is "NO", the running state is to establish no engine braking force, i.e., to have no demand for the braking, and the routine is returned. Incidentally, this decision can be made even if the D-range, the second range or the L-range is selected in the automatic transmission 2.

If the answer of Step 11 is "YES", that is, if the braking is demanded, it is decided (at Step 12) by the first controller 18 whether or not the automatic transmission 2 is at a gear stage next to the highest one, i.e., at a gear stage for establishing the engine braking force. If the answer of Step 12 is "YES", that is, if the demand for the braking is made, the routine advances to the controls of Steps 13 to 18. The control contents of Steps 13 to 18 are identical to those of Steps 3 to 8 of FIG. 3.

Incidentally, if any of the answers of Steps 12 to 14 is "NO", no demand is made for the braking so that the regenerative braking is not done by the motor-generator 9, and the routine is returned. Steps 11 to 14 correspond to the braking demand detecting means of the present invention, and Steps 15 to 17 correspond to the first braking means of the present invention.

Thus, according to the control example of FIG. 4, if the engine 1 comes while the hybrid vehicle HV is running into the idling state so that the braking demand for establishing the engine braking force is detected, the engine braking force is assisted by the regenerative braking force of the motor-generator 9 thereby to suppress the rise in the vehicle speed. As a result, even when the vehicle is downhill on a slope, the braking operation by the driver and its frequency are decreased to improve the braking performance and the drivability.

(Third Control Example)

Figure 5:
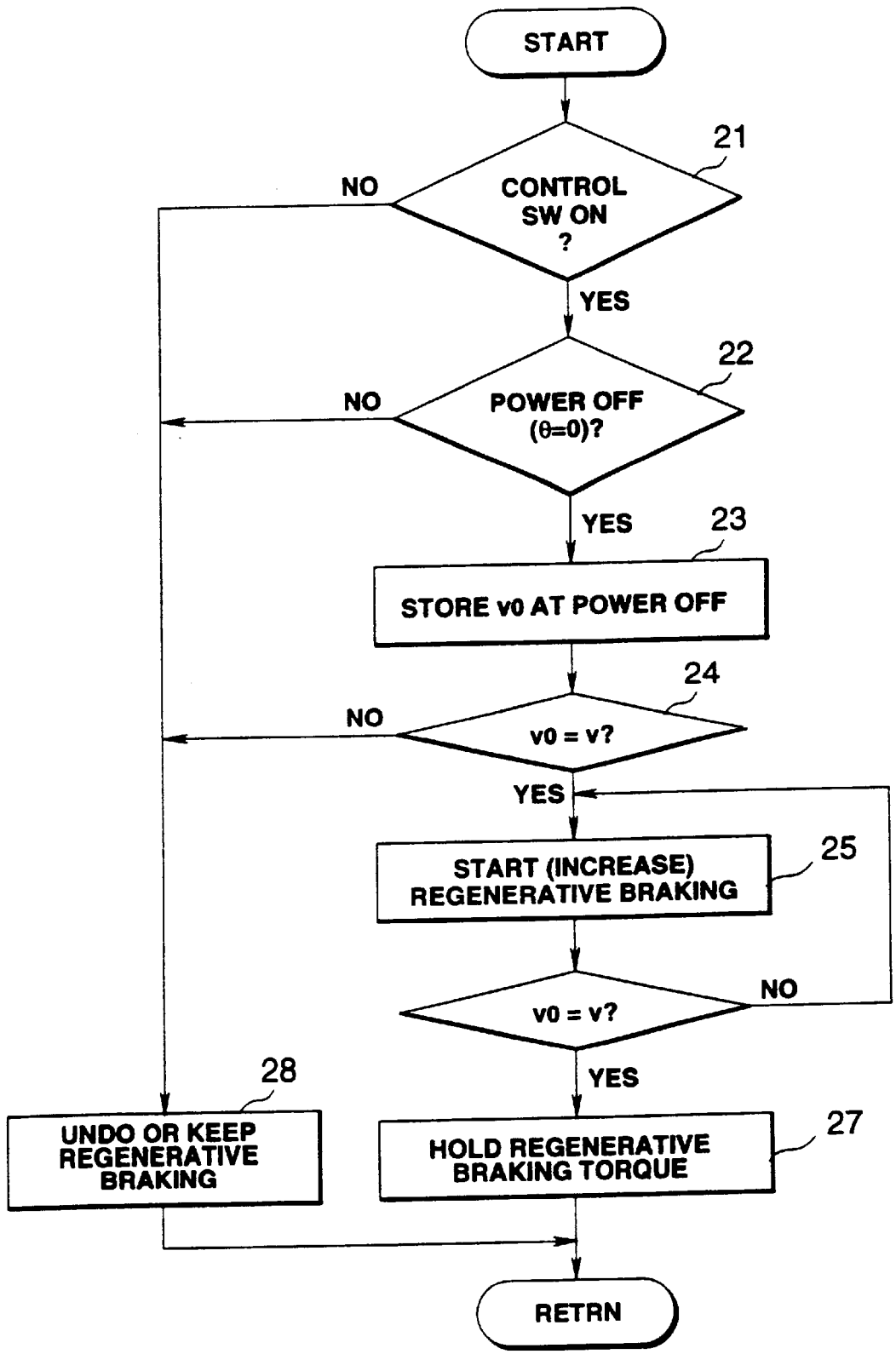
FIG. 5 is a flow chart showing another control example of the hybrid vehicle of the present invention.

FIG. 5 is a flow chart showing another control example corresponding to the first characteristic construction. In this control example, while the hybrid vehicle HV is running, it is decided (at Step 21) by the first controller 18 whether or not the downhill vehicle speed control switch 37 is ON. If the answer of Step 21 is "YES", it is decided (at Step 22) by the first controller 18 whether or not the engine 1 is idling (with power OFF), i.e., demanded for the braking.

If the answer of Step 22 is "YES", the engine braking force is established by the engine 1, and the first controller 18 stores the vehicle speed $V_0$ at the power OFF (at Step 23). Then, it is decided (at Step 24) whether or not the vehicle speed V is over the value $V_0$ after a predetermined time period from controlling at Step 23. This decision is made, as based upon whether or not the hybrid vehicle HV is running downhill so that it cannot be decelerated by the engine braking force.

If the answer of Step 24 is "YES", the deceleration cannot be done, as intended by the driver, so that the regenerative braking force of the motor-generator 9 is added. Incidentally, the control is made to increase the regenerative braking force (at Step 25) if the regenerative braking by the motor-generator 9 has already been done.

After lapse of a predetermined time from Step 25, in order to confirm the validity of the regenerative braking force, it is decided (at Step 26) by the first controller 18 whether or not the vehicle speed V is equal to the value $V_0$. If the answer of Step 26 is "YES", the regenerative braking force of the motor-generator 9 is kept as it is (at Step 27), and the routine is returned.

On the contrary, if the answer of Step 26 is "NO", that is, if the regenerative braking force is short, the routine is returned to Step 25 to increase the regenerative braking force. Incidentally, if any of the answers of Steps 21, 22 and 24 is "NO", the routine is returned (at Step 28) without doing the regenerative braking.

The road situation, in which the answer of Step 21, 22 or 24 is "NO", is exemplified by that in which the hybrid vehicle HV is running on a flat road. Moreover, if the answer of Step 21, 22 or 24 is "NO" while the regenerative braking is being done by the motor-generator 9, the regenerative braking force being outputted is kept.

Steps 21 to 24 correspond to the braking demand detecting means of the present invention, and Step 25 to 27 correspond to the first braking means of the present invention. Thus, according to the control example of FIG. 5, on the basis of the braking demand while the hybrid vehicle HV is downhill on a slope, the engine braking force is assisted by the regenerative braking force of the motor-generator 9 to suppress the rise in the vehicle speed, and the downhill vehicle speed is kept at the value at the power OFF time. As a result, the braking operation by the driver and its frequency are reduced to further improve the braking performance and the drivability.

(Fourth Control Example)

Figure 6:
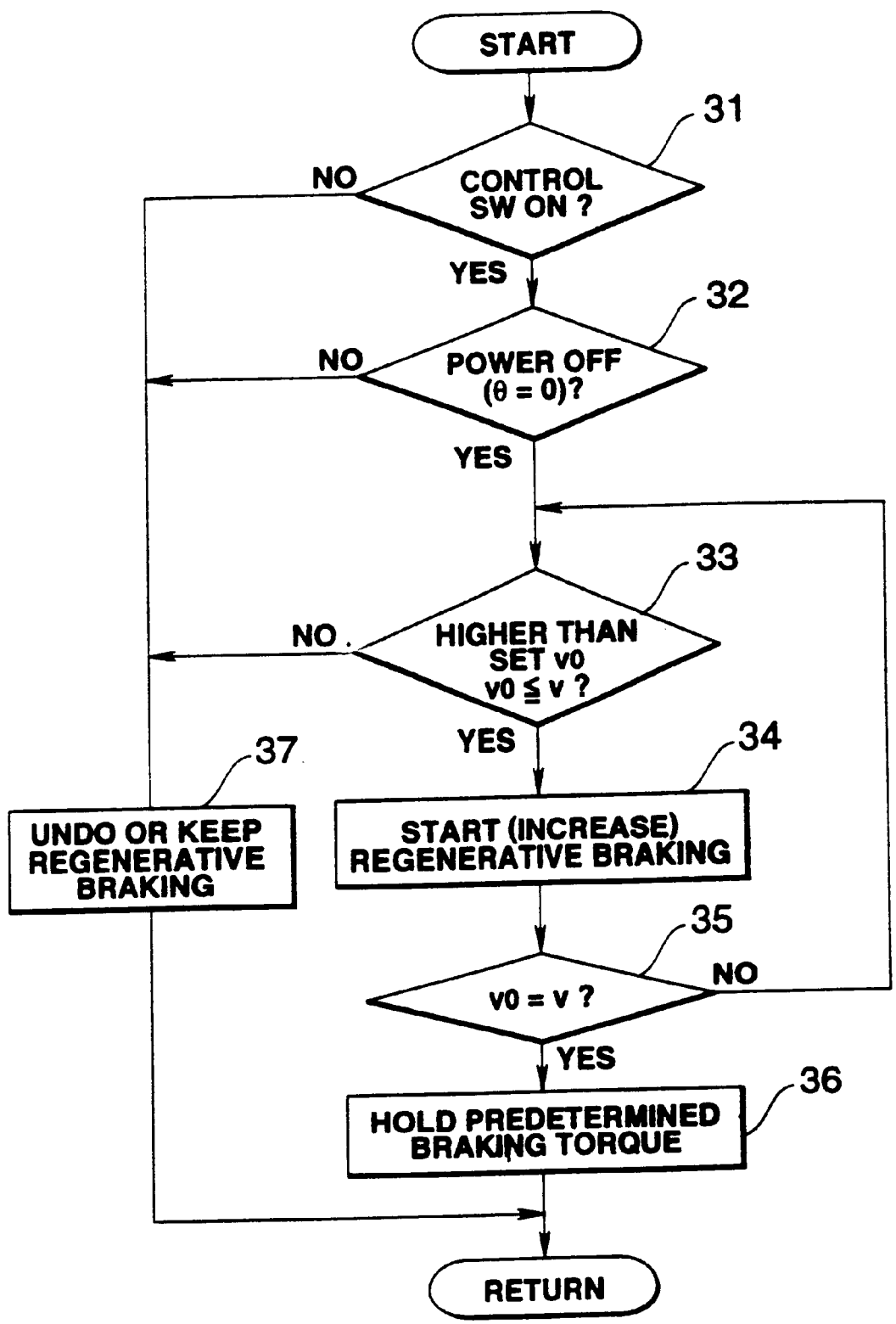
FIG. 6 is a flow chart showing another control example of the hybrid vehicle of the present invention.

FIG. 6 is a flow chart showing another control example corresponding to the first characteristic construction. According to the control example of FIG. 6, while the hybrid vehicle HV is running, it is decided (at Step 31) by the first controller 18 whether or not the downhill vehicle speed control switch 37 is ON. If the answer of the Step 31 is "YES", it is decided (at Step 32) by the first controller 18 whether or not the engine is in the idling (or power OFF) state.

If the answer of Step 32 is "YES", the engine braking force is established by the engine 1. By the first controller 18, moreover, it is decided (at Step 33) whether or not the vehicle speed V at the power OFF time is at the value $V_0$ which is set in advance by the engine braking setting dial 20, that is, whether or not the hybrid vehicle HV is downhill on a slope.

If the answer of Step 33 is "YES", the engine braking force is too short to satisfy the demand for the deceleration so that a control is made to assist the engine braking force by the regenerative braking force of the motor-generator 9. Incidentally, a control is made to increase this regenerative braking force (at Step 34) if the regenerative braking by the motor-generator 9 has already been done.

After lapse of a predetermined time from Step 34, in order to confirm the validity of the regenerative braking force, it is decided (at Step 35) by the first controller 18 whether or not the prevailing vehicle speed V is equal to the value $V_0$. If the answer of Step 35 is "YES", the regenerative braking force of the motor-generator 9 is kept as it is (at Step 36), and the routine is returned.

On the contrary, if the answer of Step 35 is "NO", that is, if the degree of deceleration is short, the routine is returned to Step 33, at which the regenerative braking force is increased till the vehicle speed V takes the value $V_0$. Incidentally, if any of the answers of Steps 31, 32 and 33 is "NO", the regenerative braking is not done. If, on the other hand, any of the answers of Steps 31, 32 and 33 is "NO" with the regenerative braking force being established in advance, the regenerative braking force is kept as it is (at Step 37), and the routine is returned.

Steps 31 to 33 correspond to the braking demand detecting means of the present invention, and Steps 34 to 36 correspond to the first braking means of the present invention. Thus, according to the control example of FIG. 6, on the basis of the braking demand of the hybrid vehicle HV, the engine braking force is assisted by the regenerative braking force of the motor-generator 9 to suppress the rise in the vehicle speed. Moreover, the downhill vehicle speed is kept at the value which is arbitrarily set by operating the engine braking setting dial 20. As a result, the braking operation by the driver and its frequency are decreased to further improve the braking performance and the drivability.

(Fifth Control Example)

Figure 7:
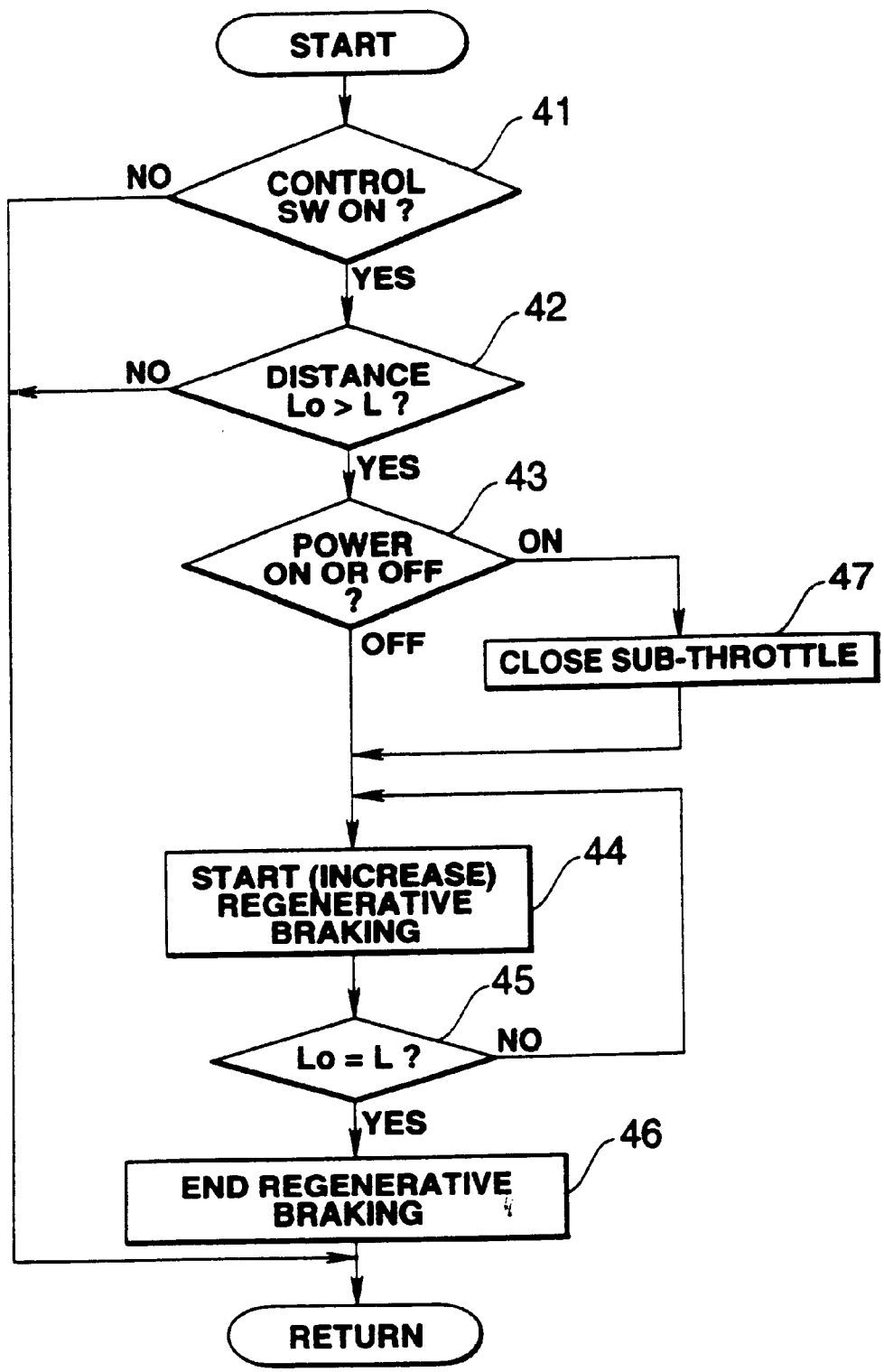
FIG. 7 is a flow chart showing another control example of the hybrid vehicle of the present invention.

FIG. 7 is a flow chart showing a control example corresponding to the second characteristic construction or the third characteristic construction. According to the control example of FIG. 7, while the hybrid vehicle HV is running, it is decided (at Step 41) by the first controller 18 whether or not the distance control switch 38 is ON. If the answer of Step 41 is "YES", a distance L between an obstruction or a preceding vehicle and the vehicle of the driver is detected by the distance sensor 23. Moreover, it is decided (at Step 42) by the first controller 18 whether or not the distance L between vehicles is below a preset distance $L_0$.

If the answer of Step 42 is "YES", it is decided (at Step 43) by the first controller 18 whether the engine 1 is in the power ON state or in the power OFF state. If this power OFF state of the engine 1 is detected at Step 43, the regenerative braking by the motor-generator 9 is started to suppress the rise in the vehicle speed. Incidentally, if the regenerative braking of the motor-generator 9 has been done in advance, the control is made to increase the regenerative braking force (at Step 44). This regenerative braking force by the control of Step 44 may be initially set stepwise according to the value of the distance L and changed from the initial braking force.

Subsequent to Step 44, it is decided (at Step 45) whether or not the distance L is equal to the value $L_0$. If the answer of Step 45 is "YES", the regenerative braking by the motor-generator 9 is ended (at Step 46), and the routine is returned.

Incidentally, if the power ON state is detected at Step 43, the signal is outputted from the first controller 18 to the sub-throttle valve actuator 39 so that the sub-throttle valve is closed to bring the engine 1 into the power OFF state (at Step 47), and the routine advances to Step 44.

If the answer of Step 41 or 42 is "NO", on the contrary, no braking force need to be established. As a result, the regenerative braking by the motor-generator 9 is undone, or the regenerative braking is kept, if it has been done in advance by the motor-generator 9, and the routine is returned. In other words, the control of the distance between the own vehicle and another vehicle is not done.

Steps 41 and 42 correspond to the obstruction detecting means of the present invention, and Steps 43 to 47 correspond to the second control means of the present invention. According to the control example of FIG. 7, if the distance between the hybrid vehicle HV and a preceding vehicle becomes short while the hybrid vehicle HV is running, this hybrid vehicle HV is braked to keep the distance constant by the regenerative braking force of the motor-generator 9. As a result, the braking operation by the driver and its frequency are decreased to improve the braking performance and the drivability.

Incidentally, in the control example of FIG. 7, the distance L need not be kept constant if it is over the value $L_0$. At the instant when a surrounding vehicle is detected, the control to establish the regenerative braking force of the motor-generator 9 could be made independently of the distance between vehicles. By this control, the braking operation by the driver and its frequency are decreased even if the hybrid vehicle HV is unexpectedly moved by the gradient while it is stopped on a slope. With this control, moreover, while the hybrid vehicle HV is stopped on a flat road, the engine 1 is kept in the idling state, and the braking operation by the driver and its frequency are decreased by the creep phenomenon coming from the torque converter 2B, even if the hybrid vehicle HV should move.

In the control example of FIG. 7, moreover an obstruction detecting sensor other than the distance sensor could be provided to detect a building, a tree and a person. By the second braking means, moreover, a control could be made to hold the distance constant between the hybrid vehicle HV and the building, the tree or the person.

(Sixth Control Example)

Figure 8:
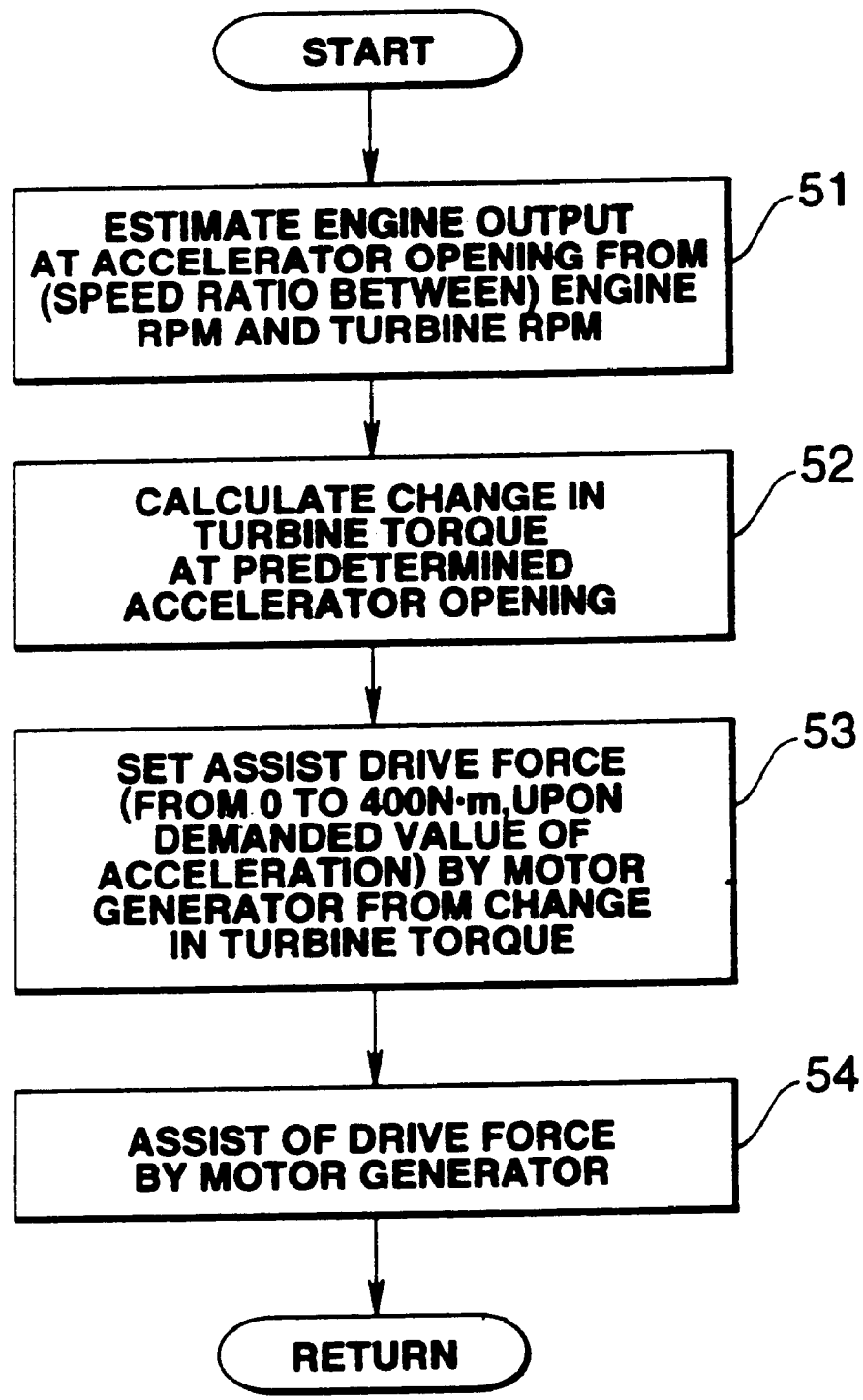
FIG. 8 is a flow chart showing another control example of the hybrid vehicle of the present invention.
Figure 9:
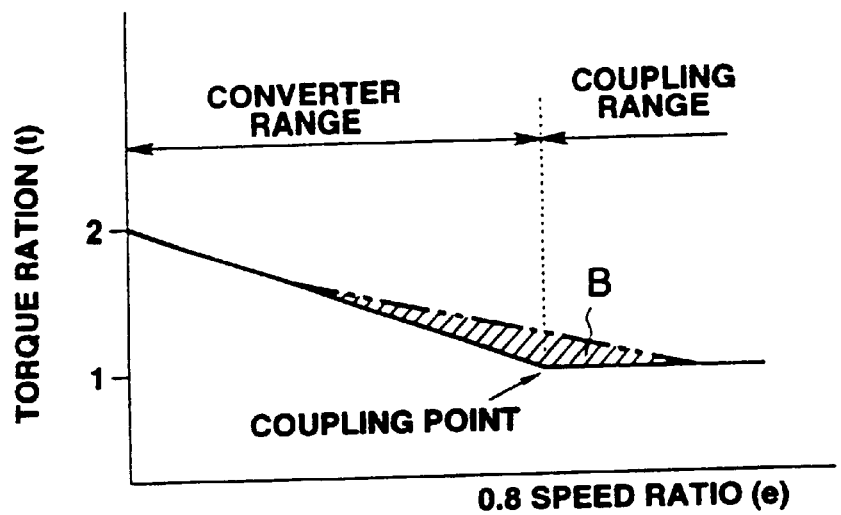
FIG. 9 is a characteristic diagram illustrating a relation between a torque ratio and a speed ratio, as detected in the control example of FIG. 8.
Figure 10:
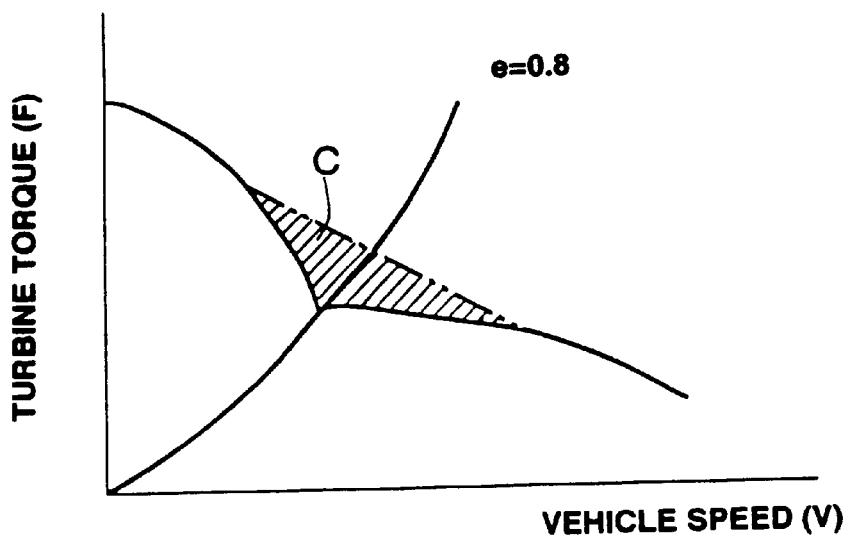
FIG. 10 is a characteristic diagram illustrating a relation between a turbine torque and a vehicle speed, as detected in the control example of FIG. 8.
Figure 11:
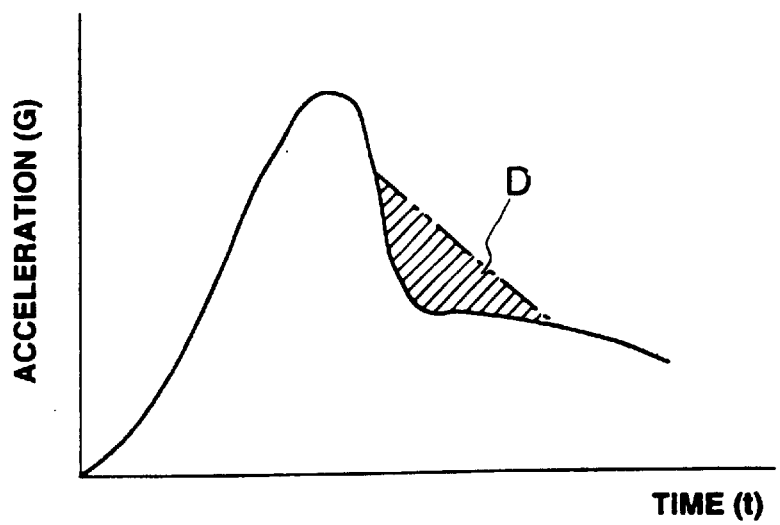
FIG. 11 is a characteristic diagram illustrating a relation between an acceleration and a time, as detected in the control example of FIG. 8.

FIG. 8 is a flow chart showing a control example corresponding to the fourth characteristic construction. FIG. 9 is a characteristic diagram illustrating a relation between a torque ratio "t" between the front cover 2F and the turbine runner 2H of the torque converter 2B, and a speed ratio "e" between the front cover 2F and the turbine runner 2H. Incidentally, in this control example, when the speed ratio "e"between the front cover 2F and the turbine runner 2H is to be determined, the engine RPM is used in place of the RPM of the front cover 2F. FIG. 10 is a characteristic diagram illustrating a relation between a turbine torque F and the vehicle speed V, and FIG. 11 is a characteristic diagram illustrating a relation between the time "t" and the acceleration G of the hybrid vehicle HV.

First of all, when the hybrid vehicle HV starts its run, the RPM of the engine 1 is detected by the engine RPM sensor 24, and the RPM of the turbine runner 2H of the automatic transmission 2 is detected by the turbine RPM sensor 25. Moreover, the vehicle speed of the hybrid vehicle HV is detected by the vehicle speed sensor 22, and the longitudinal acceleration of the hybrid vehicle HV is detected by the acceleration sensor 30. These detected signals are inputted to the first controller 18.

On the basis of the ratio between the engine RPM and the turbine RPM, i.e., the speed ratio, moreover, the output torque of the engine 1 at a predetermined accelerator opening is estimated (at Step 51) by the first controller 18. Next, on the basis of the ratio between the engine RPM and the turbine RPM, the change in the turbine torque at the predetermined accelerator opening is calculated (at Step 52).

Next, the magnitude of the drive force to be outputted from the motor-generator 9 is set (at Step 53) in accordance with the running state for the turbine torque to change. This magnitude of the drive force is set to about 0 to 400 NEm, for example, on the basis of the demanded value of the acceleration or the like.

When the motor-generator 9 is stopped, the drive force, as set at Step 53, is outputted from the motor-generator 9 so that the output of the motor-generator 9 is added (at Step 54) to the drive force during the run of the hybrid vehicle HV.

If the motor-generator 9 has already activated, on the contrary, a control is made to increase the drive force. Steps 51 to 53 correspond to the output torque estimating means of the present invention, and Step 54 corresponds to the first control means of the present invention.

When the hybrid vehicle HV runs, as described above, the torque ratio of the torque converter 2B gradually lowers in the converter range, as illustrated in FIG. 9, and transfers through a coupling point to a coupling range until it is kept at a substantially constant level. On the other hand, the turbine torque changes in its changing rate across the coupling point, as illustrated in FIG. 10, as the vehicle speed rises. During the run of the hybrid vehicle HV, therefore, the changing rate of the acceleration abruptly fluctuates, as illustrated in FIG. 11, across the coupling point of the torque converter 2B in accordance with the change in the turbine torque.

In this control example, therefore, the control of the motor-generator 9 is made in the torque transmission region containing the coupling point, on the basis of the change in the changing rate of the turbine torque, as detected at Step 52. Specifically, the drive force corresponding to regions B, C and D, as hatched in FIG. 9, 10 or 11, is outputted from the motor-generator 9 thereby to assist the fluctuation of the turbine torque. As a result, the changing rate of the acceleration of the hybrid vehicle HV is stabilized to improve the accelerating ability thereby to improve the running performance, the riding comfort and the drivability.

Incidentally, in the control example of FIG. 8, the motor-generator 9 is activated, or its drive force is increased with reference to the coupling point at which the changing rate of the turbine torque is prominent. On the other hand, the acceleration could be improved by suppressing the output torque of the engine 1 in the running state of the hybrid vehicle HV, e.g., at the start or acceleration of the hybrid vehicle HV, to compensate the shortage of the output torque with the drive force of the motor-generator 9.

(Seventh Control Example)

Figure 13:
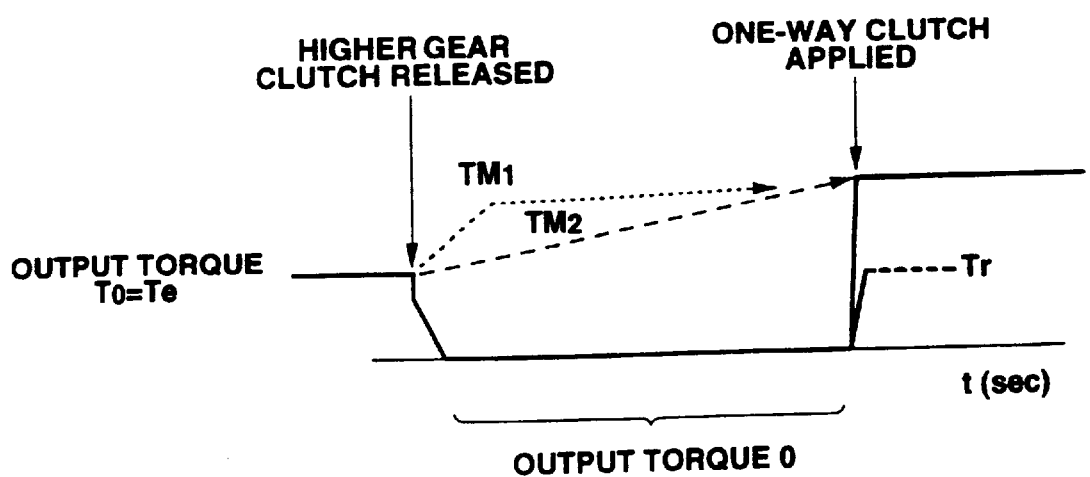
FIG. 13 is a characteristic diagram illustrating changes in the output torque of an automatic transmission in case a downshift is executed in the control example of FIG. 12.

FIG. 12 is a flow chart showing a control example corresponding to the fifth characteristic construction. FIG. 13 is a characteristic diagram illustrating a relation between an output torque $T_O$ of the automatic transmission 2 and the time "t" in the control example of FIG. 12. First of all, while the hybrid vehicle HV is running, the running state (e.g., the throttle opening or the vehicle speed) is detected (at Step 61) by the first controller 18. By this first controller 18, moreover, it is decided (at Step 61) whether or not the running state is for the downshift by the automatic transmission 2.

If the answer of Step 61 is "YES", the downshift is started by the automatic transmission 2. If the accelerator pedal is depressed to its full stroke, the kickdown shift is done. The running state to be answered by "YES" at Step 61 is exemplified by the state in which as the hybrid vehicle HV comes to an uphill, it is detected that the throttle is fully opened by the driver's deep depression of the accelerator pedal.

This downshift is executed by switching the applied/released states of the frictional engagement elements of the automatic transmission 2 such as the clutch at a higher gear stage and the one-way clutch at a lower gear stage. Specifically, as illustrated in FIG. 13, the output torque abruptly drops simultaneously as the clutch at the higher gear stage is released. After this, the one-way clutch at the lower gear stage is applied to establish a higher output torque than that before the downshift, thus ending the downshift. As a result, the output torque $T_O$ of the automatic transmission 2 is transiently lowered to 0 after the clutch at the higher gear stage is released and before the one-way clutch at the lower gear stage is locked.

In this control example, therefore, the drive force is outputted from the motor-generator 9 during the time period after the clutch at the higher gear stage is released and before the one-way clutch at the lower gear stage is applied to establish a reaction. If the motor-generator 9 is already active, on the other hand, a control is made to increase the drive force (at Step 62). It is then decided (at Step 63) by the first controller 18 whether or not the downshift is ended.

If the answer of Step 63 is "YES", a control is made (at Step 64) to stop the motor-generator 9 or to restore the original drive force. Incidentally, if the answer of Step 61 is "NO", the routine is returned without doing the downshift and without outputting or increasing the drive force of the motor-generator 9.

Step 61 corresponds to the downshift detecting means of the present invention, and Steps 62 to 64 correspond to the second control means of the present invention.

The following control example is done when the reduction in the drive force of the vehicle due to the reduction in the output torque of the automatic transmission 2 is to be assisted by the drive force of the motor-generator 9, as described above. First of all, the drive force of the motor-generator 9 is so established that the output torque steeply rises from that at the higher gear stage, as indicated by broken curve $TM_1$ in FIG. 13. After this, the drive force of the motor-generator 9 is so controlled to shift gently to the output torque at the lower gear stage so that the acceleration may be physically felt by the driver.

Moreover, the drive force of the motor-generator 9 is so controlled at a constant rate from the output torque at the higher gear stage to the output torque at the lower gear stage, as indicated by dotted curve TM2, to suppress the shift shock.

Incidentally, in the control example of FIG. 12, a control could be made to establish or increase the drive force of the motor-generator 9 at the instant when it is detected at Step 61 that the running state is for the downshift, that is, before the higher gear stage clutch is released.

For the control of FIG. 12, moreover, the drive force of the motor-generator 9 may be set to a larger value than that in a running mode other than the power mode if this power mode is set by the mode setting switch 26. So long as the power mode is set, furthermore, a control could be made to output or increase the drive force of the motor-generator 9 thereby to establish a different accelerating feel for each running mode.

Thus, according to the control example of FIG. 12, the output of the motor-generator 9 is added to the drive force of the vehicle if the downshift is effected in the automatic transmission 2 to lower the drive force of the vehicle. As a result, the transient acceleration responsiveness at the downshift time is improved to suppress the shift shock thereby to improve the running performance, the riding comfort and the drivability.

(Eighth Control Example)

Figure 14:
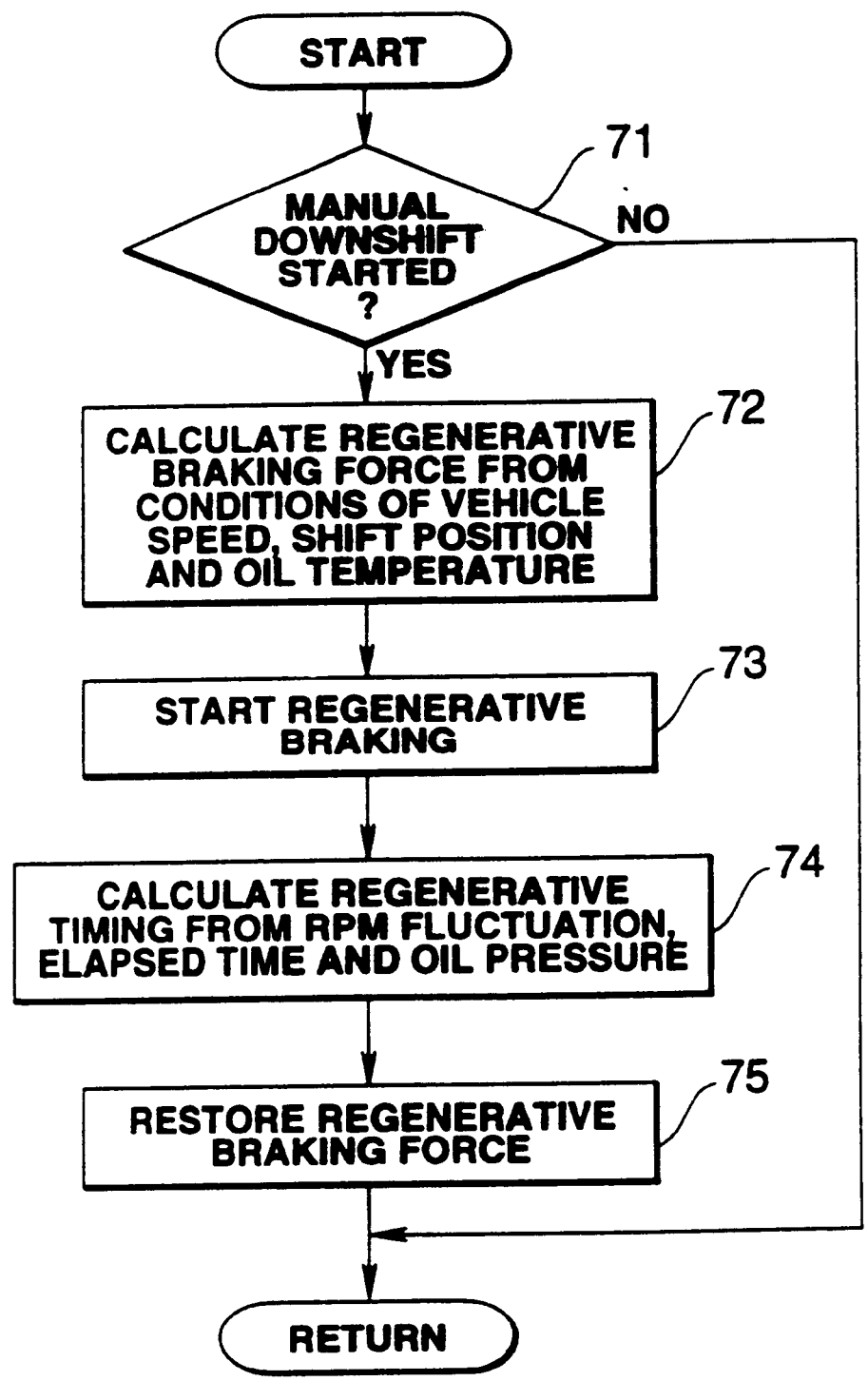
FIG. 14 is a flow chart showing another control example of the hybrid vehicle of the present invention.

FIG. 14 is a flow chart showing another control example corresponding to the fifth characteristic construction. This control example is applied to the state in which the accelerator pedal, for example, is released to reduce the throttle opening to 0% while the hybrid vehicle HV is running.

First of all, it is decided (at Step 71) by the first controller 18 whether or not a manual shift such as a shift from the D-range to the second range or from the D-range to the L-range has been executed by the operation of the driver or by turning OFF the overdrive switch 19. If the answer of Step 71 is "YES", the (not-shown) servo actuator is activated by the operation of the shift solenoid valve 33 of the automatic transmission 2 so that the frictional engagement elements are applied/released to switch the gear stage from a higher one to a lower one to effect the downshift.

Figure 15:
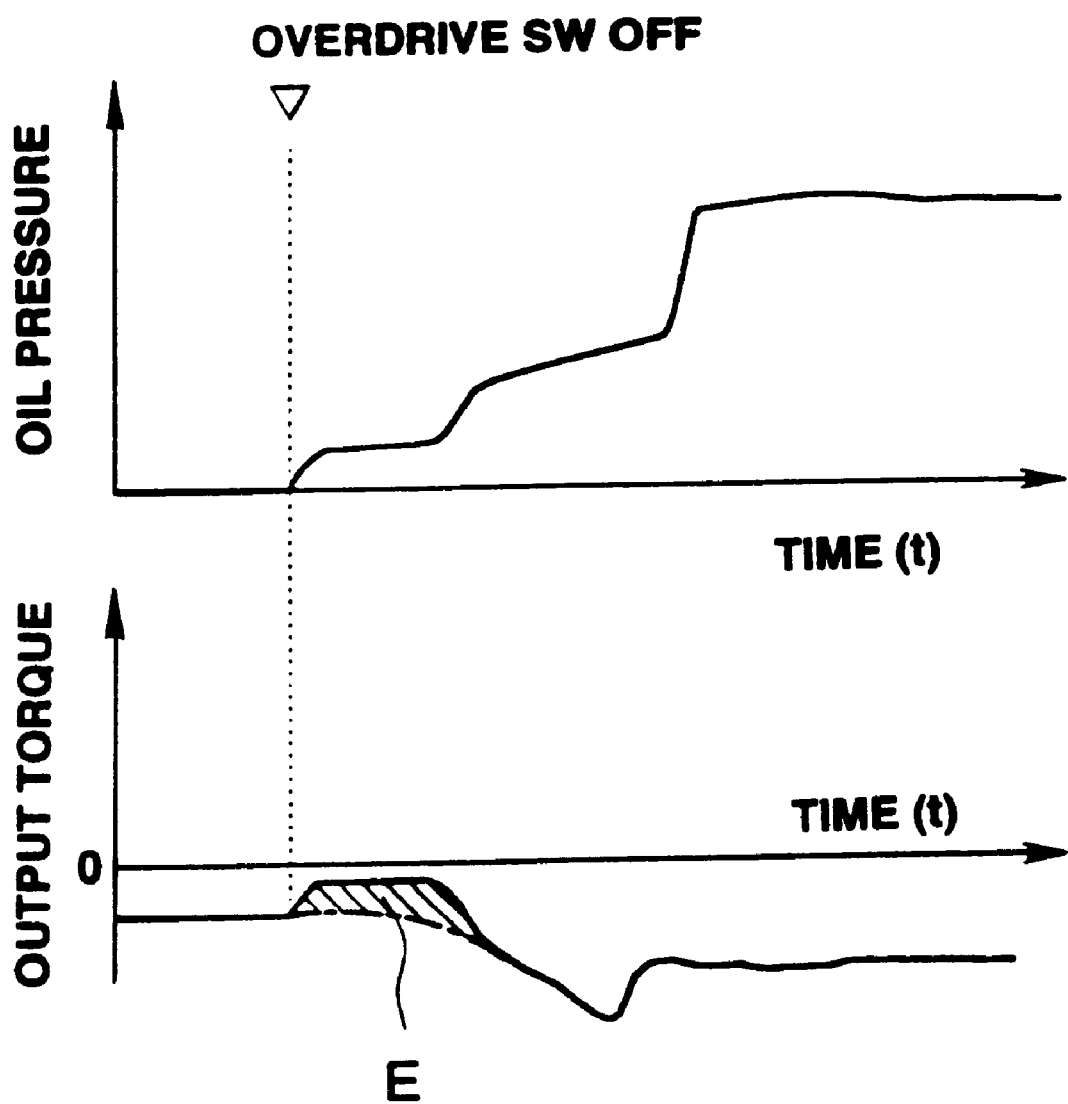
FIG. 15 is a characteristic diagram illustrating changes in the output torque of the automatic transmission and in the oil pressure of a servo actuator when the downshift of the automatic transmission is executed in the control example of FIG. 14.

In accordance with this downshift, the oil pressure of the servo actuator for actuating the frictional engagement elements for the lower gear stage gradually rises, as illustrated in FIG. 15. As a result, the automatic transmission 2 temporarily approaches to the neutral state for the time period after the frictional engagement elements for the overdrive are released and before the frictional engagement elements for the lower gear stage are applied, so that the engine braking force drops. Then, the frictional engagement elements for the lower gear stage has a sufficient torque capacity to increase the engine braking force. Thus, the torque highly fluctuates so that the braking force transiently becomes short.

In this control example, therefore, if the answer of Step 71 is "YES", the regenerative braking force of the motor-generator 9 is calculated (at Step 72) on the basis of the conditions including the vehicle speed as detected by the vehicle speed sensor 22, the shift position as detected by the shift position sensor 21, and the oil pressure of the servo actuator, as detected by the oil pressure sensor 31. The regenerative braking force to be calculated at Step 72 corresponds to a region E in which the output torque of the automatic transmission 2 is temporarily raised, and is generated. Incidentally, if the regenerative braking force is established in advance, a control is made to increase it.

After this, the timing for releasing the regenerative braking force by the motor-generator 9 or for restoring the original regenerative braking force is calculated (at Step 74) on the basis of the fluctuation in the RPM of the counter shaft 2C of the automatic transmission 2, the elapsed time from the start of the regenerative braking, or the oil pressure as detected by the oil pressure sensor 31. Then, the regenerative braking force of the motor-generator 9 is restored (at Step 75) at the restoration timing calculated at the Step 74, and the routine is returned.

Incidentally, if the answer of Step 71 is "NO", the routine is returned. Step 71 corresponds to the downshift detecting means of the present invention, and Steps 72 to 75 correspond to the second control means of the present invention.

Thus, according to the control example of FIG. 14, at the downshift of the automatic transmission 2, the control is made to add the drive force of the motor-generator 9 to the drive force of the vehicle. As a result, the change in the drive force of the vehicle can be suppressed to prevent the shift shock thereby to improve the accelerating performance.

(Ninth Control Example)

Figure 16:
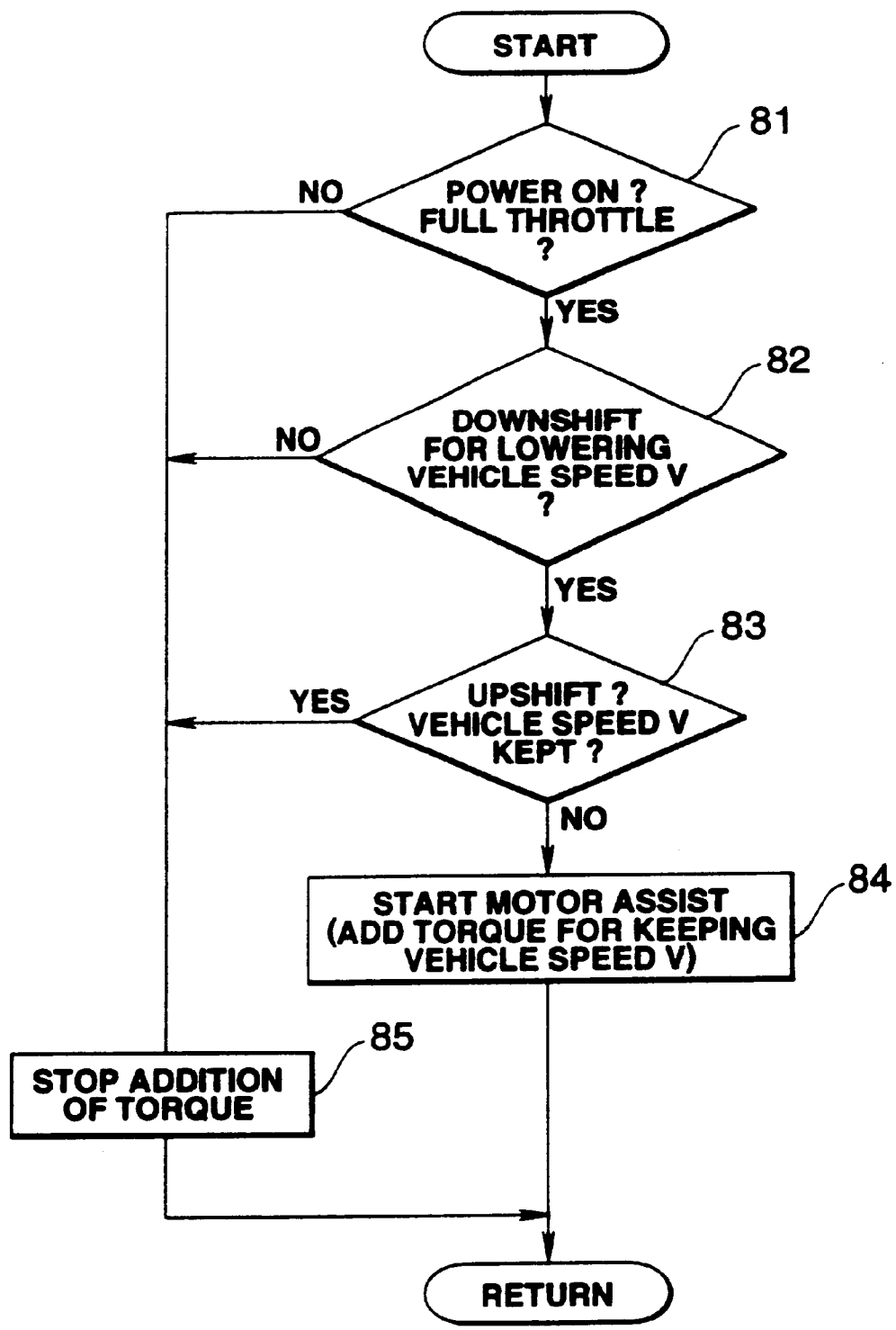
FIG. 16 is a flow chart showing another control example of the hybrid vehicle of the present invention.

FIG. 16 is a flow chart showing a control example corresponding to the sixth characteristic construction. In the control example of FIG. 16, while the hybrid vehicle HV is running, it is decided (at Step 81) by the first controller 18 on the basis of the signal of the throttle sensor 35 whether or not the engine 1 is power-ON and whether or not the throttle valve is fully open. For example, it is decided whether or not the running states demands the accelerating ability or the drive force, as when the vehicle enters the main lanes from the ramp way of a highway or uphills a slope. Incidentally, the vehicle speed V in this running state is also detected at Step 81.

When the vehicle speed V, as detected a predetermined time after the control of Step 81, is lower than the value V which is detected at Step 81, it is decided (at Step 82) whether or not the drive force is raised by the downshift of the automatic transmission 2.

If the answer of Step 82 is "YES", it is decided (at Step 83) whether or not the hybrid vehicle HV is accelerated by the downshift until the automatic transmission 2 is shifted up on the basis of the shift pattern, and whether or not the vehicle speed V after the upshift is kept.

If the answer of the Step 83 is "NO", that is, if the accelerating ability is short, a control is made to establish the drive force of the motor-generator 9. If the motor-generator 9 is already driven, a control is made to increase the drive force of the motor-generator 9 (at Step 84), and the routine is returned. The drive force of the motor-generator 9 of this case is kept so that the automatic transmission 2 may not be shifted down.

Incidentally, if the answer of Step 81 or 82 is "NO" or if the answer of Step 83 is "YES", a control is made to keep the stopped state of the motor-generator 9. If the motor-generator 9 is already driven, on the other hand, a control is made to keep the drive force (at Step 85), and the routine is returned.

Steps 81 to 83 correspond to the speed changing frequency detecting means of the present invention, and Step 84 corresponds to the third control means of the present invention.

According to this control example, in the case of the road situation in which the hybrid vehicle HV is shifted down because its speed drops during its run and in which the vehicle is then shifted up so that its speed cannot be kept, the shortage of the drive force of the vehicle is compensated by the drive force of the motor-generator 9. In short, the drop in the vehicle speed is suppressed so that the automatic transmission 2 can be easily kept at a predetermined gear stage.

As a result, the frequent speed change, i.e., the hunting of the automatic transmission 2 is prevented to improve the riding comfort and the drivability. Incidentally, in this control example, a control could be made to add the output of the motor-generator 9 to the drive force of the vehicle while the vehicle is running in that state in which the upshift and downshift of the automatic transmission 2 are repeated within a predetermined time period.

(Tenth Control Example)

Figure 17:
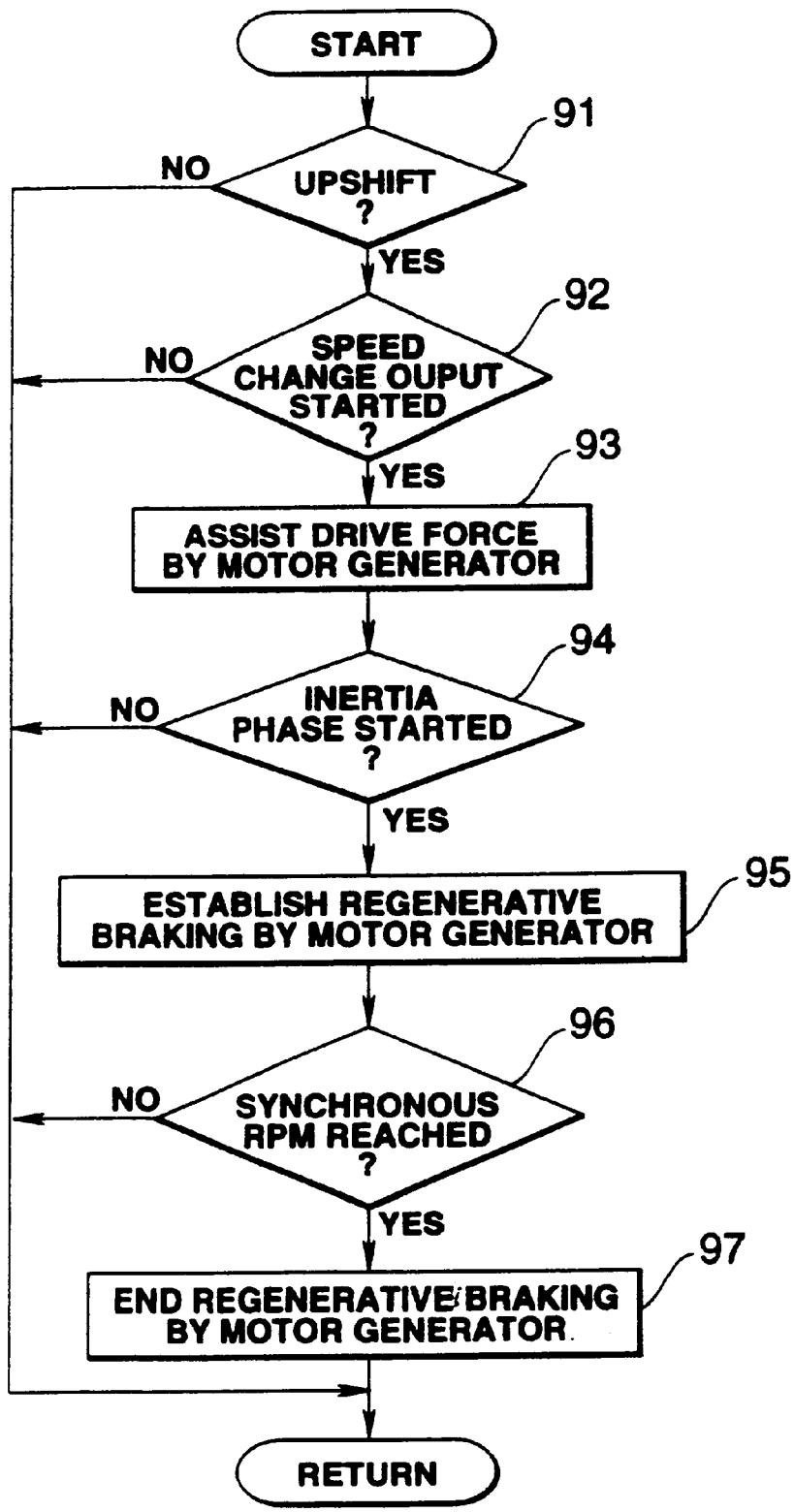
FIG. 17 is a flow chart showing another control example of the hybrid vehicle of the present invention.
Figure 18:
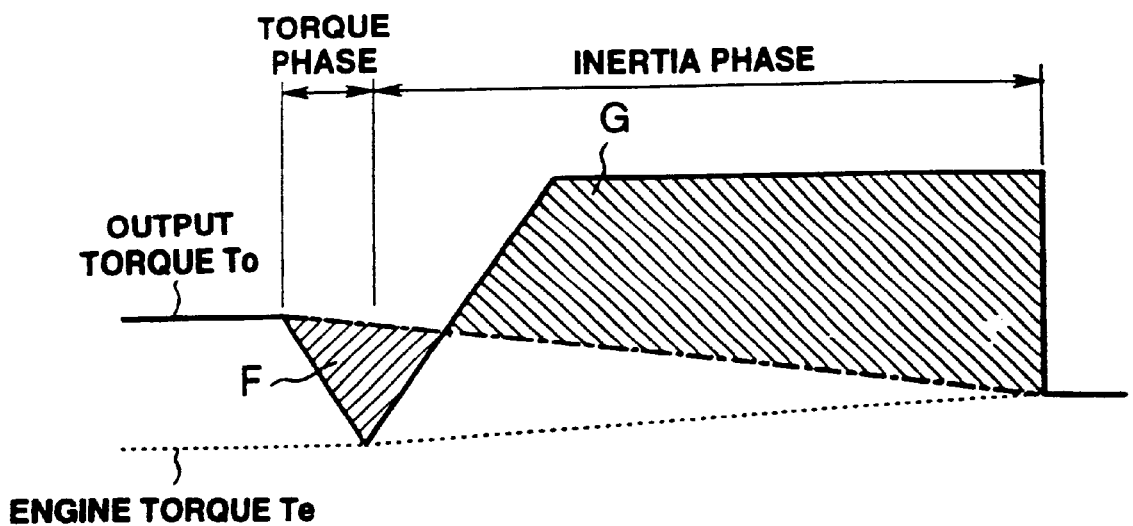
FIG. 18 is a characteristic diagram illustrating changes in the output torque of the automatic transmission and in the engine torque in the control example of FIG. 17.

FIG. 17 is a flow chart showing a control example corresponding to the seventh characteristic construction. FIG. 18 is a characteristic diagram illustrating a relation between the output torque Te of the engine 1 and the output torque To of the automatic transmission 2 in the control example of FIG. 17. The output torque Te the engine 1 is indicated by a dotted curve, and the output torque To of the automatic transmission 2 is indicated by solid curve. In the control example of FIG. 17, it is decided (at Step 91) by the first controller 18 whether or not the vehicle is in the running state for an upshift of the automatic transmission 2, for example, from the second to third speeds.

If the answer of Step 91 is "YES", the control signal is outputted from the first controller 18 to the shift solenoid valve 33 so that the frictional engagement elements of the automatic transmission 2 are switched to change the transmission route of the torque. It is also decided (at Step 92) by the first controller 18 whether or not the speed change output of the automatic transmission 2 is started.

If the answer of Step 92 is "YES", the output torque of the automatic transmission 2 drops to a level substantially equal to the engine torque, as illustrated in FIG. 18. Then, the motor-generator 9 is activated by the first controller 18 so that the drive force is transmitted to the rear wheels 14 and 15 to compensate the drop in the drive force of the vehicle (at Step 93).

It is further detected (at Step 94) by the first controller 18 whether or not the torque phase is ended in the automatic transmission 2 so that an inertia phase is started. This inertia phase is decided by the well-known method on the basis of the turbine RPM, as detected by the turbine RPM sensor 25, the output shaft RPM, as detected by the output shaft RPM sensor 40, and the gear ratios of the individual gear stages.

If the answer of Step 94 is "YES", the output torque of the automatic transmission 2 rises, as illustrated in FIG. 18, the drive force of the motor-generator 9 is released at the instant when a predetermined output torque is detected whereas the regenerative braking force is established by the motor-generator 9 (at Step 95).

After this, the output torque of the automatic transmission 2 is kept at a substantially constant level, as illustrated in FIG. 18, and it is decided (at Step 96) by the first controller 18 whether or not the synchronous RPM for the third speed is reached. When the synchronous RPM is reached, the output torque of the automatic transmission 2 abruptly drops to a level substantially equal to the engine torque. Then, a control is made to end the regenerative braking of the motor-generator 9 (at Step 97), and the routine is returned.

Incidentally, if any of the answers of Steps 91, 92, 94 and 96 is "NO", the routine is returned.

Step 91 corresponds to the upshift detecting means of the present invention, and Steps 93 to 97 correspond to the fourth control means of the present invention.

Thus, according to the control example of FIG. 17, at the upshift of the automatic transmission 2, in the region F corresponding to the reduction in the output torque in the torque phase, a control is made to add the output of the motor-generator 9 to the drive force of the vehicle. In the region G in which the output torque rises, on the other hand, a control is made to output the regenerative braking force from the motor-generator 9. As a result, independently of the change in the output torque of the automatic transmission 2, the changing rate of the sum of the torques to be transmitted to the front wheels 7 and 8 and the rear wheels 14 and 15 is suppressed, as indicated by single-dotted curve, to improve the running performance, the riding comfort and the drivability.

(Eleventh Control Example)

Figure 19:
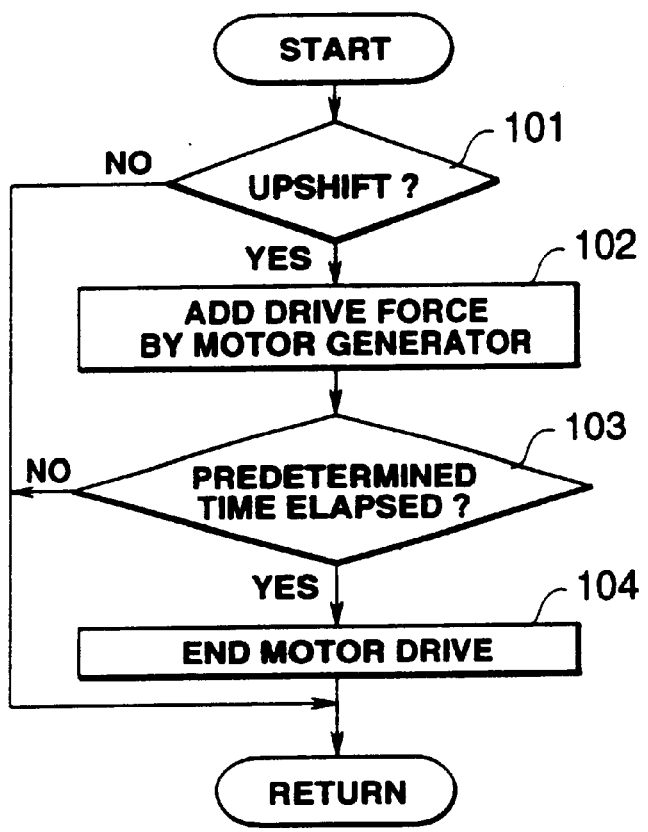
FIG. 19 is a flow chart showing another control example of the hybrid vehicle of the present invention.
Figure 20:
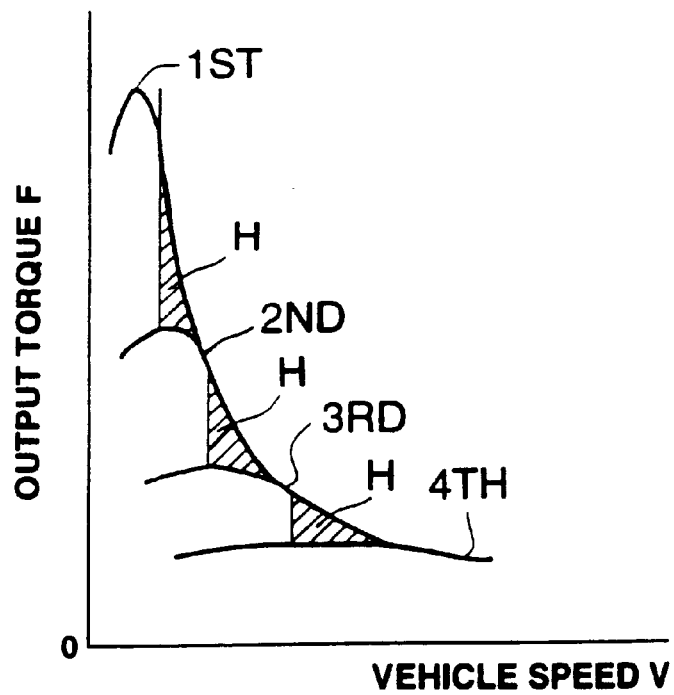
FIG. 20 is a characteristic diagram illustrating a relation between changes in the output torque at the individual gear stages of the automatic transmission and the vehicle speed in the control example of FIG. 19.
Figure 21:
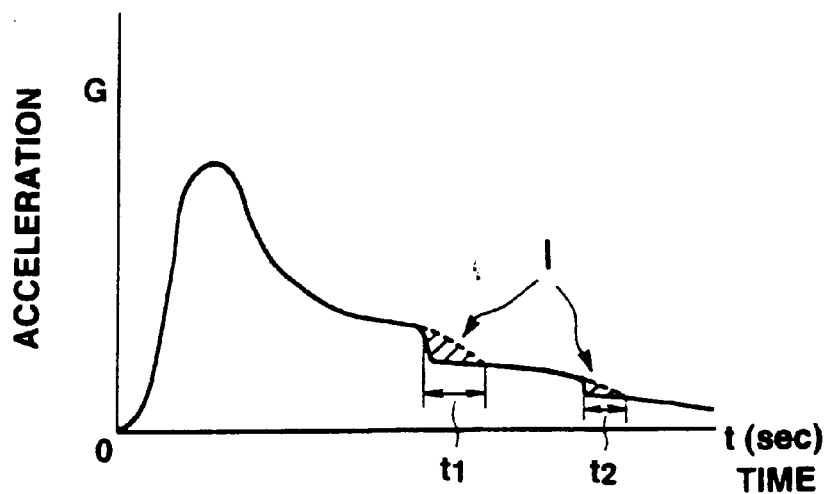
FIG. 21 is a characteristic diagram illustrating a relation between the acceleration of the vehicle and the time in the control example of FIG. 19.

FIG. 19 is a flow chart showing a control example corresponding to the eighth characteristic construction. FIG. 20 is a characteristic diagram illustrating a relation between the output torque of the automatic transmission 2 and the vehicle speed in the control example of FIG. 19, and FIG. 21 is a characteristic diagram illustrating a relation between the acceleration of the hybrid vehicle HV and the time in the control example of FIG. 19.

First of all, while the hybrid vehicle HV is running, it is decided (at Step 101) by the first controller 18 whether or not a speed change of the automatic transmission 2, i.e., the upshift is executed by applying/releasing the frictional engagement elements. If the answer of the Step 101 is "YES", the output torque abruptly drops at the time of changing the gear stage to another, as illustrated in FIG. 20, and the acceleration abruptly drops in a transient manner, as illustrated in FIG. 21.

In this control example, therefore, the drive force corresponding to the region H of the drop of the output torque, as caused by the speed change of the automatic transmission 2, as illustrated in FIG. 20, is outputted from the motor-generator 9. If the motor-generator 9 is driven in advance, a control is made to increase the drive force. As a result, the accelerations corresponding to their drop regions I, as indicated in FIG. 21, are compensated.

Then, it is decided (at Step 103) by the first controller 18 whether or not the assist of the drive force of the motor-generator 9 is executed for a predetermined time period. If the answer of Step 103 is "YES", a control is made (at Step 104) to end the driven of the motor-generator 9 or to restore the original drive force, and the routine is returned. The predetermined time periods t1 and t2 to be applied for making the decision of Step 103 are so set in advance for the individual gear stages as to establish predetermined accelerations, and are stored in the first controller 18.

If either of the answers of Steps 101 and 103 is "NO", the routine is returned. Step 101 corresponds to the speed change detecting means of the present invention, and Steps 102 to 104 correspond to the fifth control means of the present invention.

Thus, according to the control example of FIG. 19, the output of the motor-generator 9 is added to the drive force of the vehicle on the basis of the change in the output torque at the speed change of the automatic transmission 2. As a result, independently of the output torque of the automatic transmission 2, the accelerating ability is improved to improve the running performance, the riding comfort and the drivability.

(Twelfth Control Example)

Figure 22:
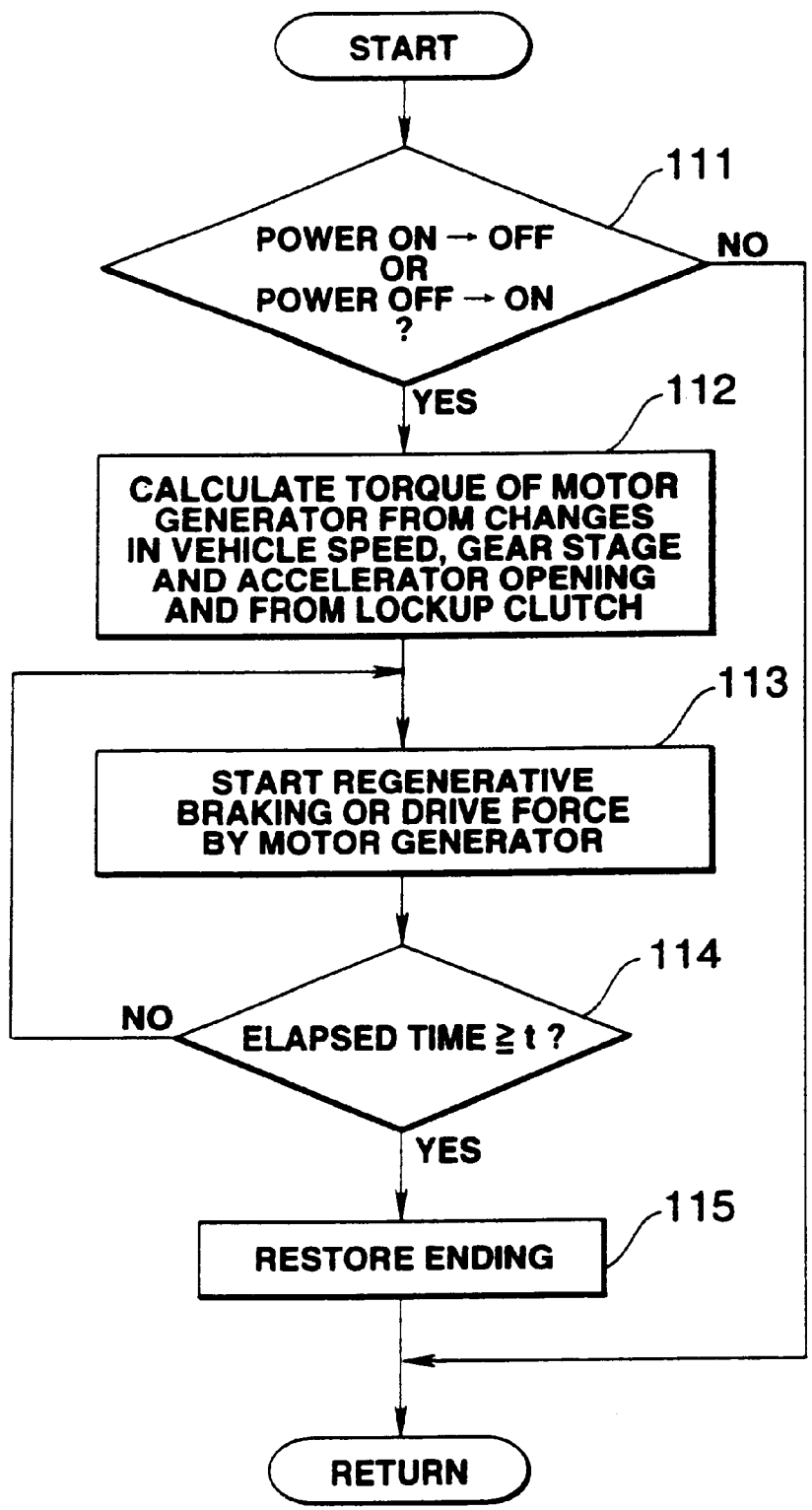
FIG. 22 is a flow chart showing another control example of the hybrid vehicle of the present invention.
Figure 23:
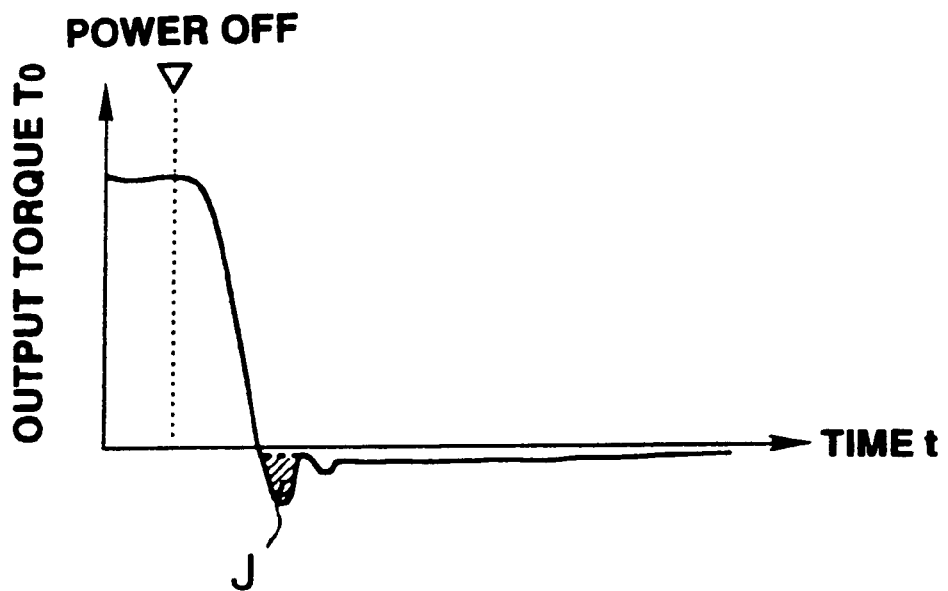
FIG. 23 is a characteristic diagram illustrating a relation between a change in the output torque of the automatic transmission and the time in the control example of FIG. 22.
Figure 24:
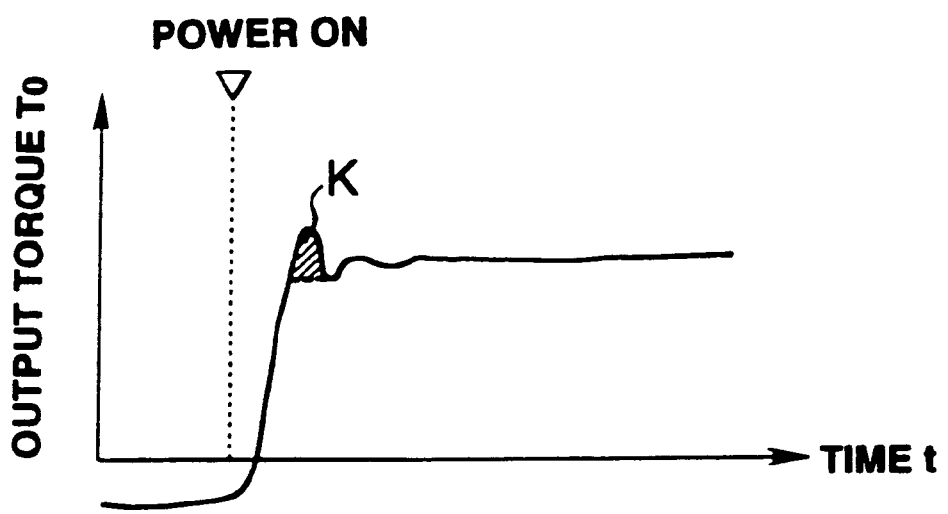
FIG. 24 is a characteristic diagram illustrating a relation between a change in the output torque of the automatic transmission and the time in the control example of FIG. 22.

FIG. 22 is a flow chart showing a control example corresponding to the ninth characteristic construction. FIGS. 23 and 24 are characteristic diagrams illustrating relations between the output torque of the automatic transmission 2 and the time in the control example of FIG. 22. In the control example of FIG. 22, while the hybrid vehicle HV is running, the opening/closing actions of the throttle valve of the engine 1 are detected by the first controller 18. Specifically, it is decided (at Step 111) whether or not the throttle valve of the engine 1 is switched from ON (open) to OFF (closed), or from OFF (closed) to ON (open).

If the answer of Step 111 is "YES", the output torque of the automatic transmission 2 is changed, for example, as illustrated in FIG. 23 or 24. Specifically, if the throttle valve is switched from ON to OFF, the output torque abruptly drops, as illustrated in FIG. 23, and then rises by a predetermined extent to a generally constant state. If the throttle valve is switched from OFF to ON, on the other hand, the output torque abruptly rises, as illustrated in FIG. 24, and then falls by a predetermined extent to a generally constant state. Thus, the phenomenon that the output torque instantly rises/falls (or is inverted) is caused by the chatter, as existing in the speed change mechanism or the torque transmission mechanism of the automatic transmission 2, and by the inertia force at the rotating time.

In this control example, therefore, the regenerative braking force or drive force in the direction to suppress the changing width of the output torque is calculated according to the increasing/decreasing regions J and K of the output torque, and the time period for applying the regenerative braking force or drive force is calculated (at Step 112) by the first controller 18. The aforementioned regenerative braking force or drive force is calculated with reference to the vehicle speed or the gear stage of the automatic transmission 2. The regenerative braking force or drive force could be calculated with reference to the accelerator opening or the applied/released state of the lockup clutch 2B.

On the basis of the calculation result of Step 112, moreover, at the increasing time of the output torque, a control is made to add the regenerative braking force of the motor-generator 9. At the decreasing time of the output torque, on the other hand, a control is made to add the drive force of the motor-generator 9 (at Step 113) thereby to suppress the change in the drive force of the vehicle.

It is then decided (at Step 114) whether or not the time period for applying the regenerative braking force or drive force of the motor-generator 9 exceeds the value which is set at Step 112. If the answer of Step 114 is "YES", the ending of the application of the regenerative braking force or drive force of the motor-generator 9 is restored (at Step 115), and the routine is returned.

Incidentally, if the answer of Step 111 is "NO", the routine is returned. If the answer of Step 114 is "NO", the routine is returned to Step 113.

Step 111 corresponds to the first detect means of the present invention, and Steps 112 to 114 correspond to the sixth control means of the present invention.

Thus, according to the control example of FIG. 22, when the power-ON and power-OFF are switched in the engine 1 to change the output torque of the automatic transmission 2, the drive force or regenerative braking force of the motor-generator 9 is added to the drive force of the vehicle. As a result, the change in the drive force of the vehicle can be suppressed to prevent an abrupt acceleration/deceleration and the vibration of the vehicle body thereby to improve the running performance, the riding comfort and the drivability.

(Thirteenth Control Example)

Figure 25:
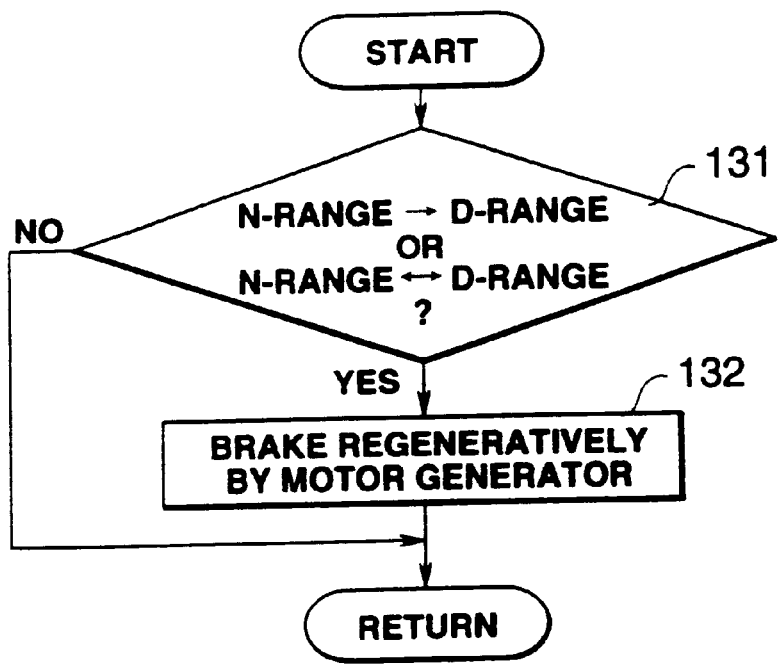
FIG. 25 is a flow chart showing another control example of the hybrid vehicle of the present invention.
Figure 26:
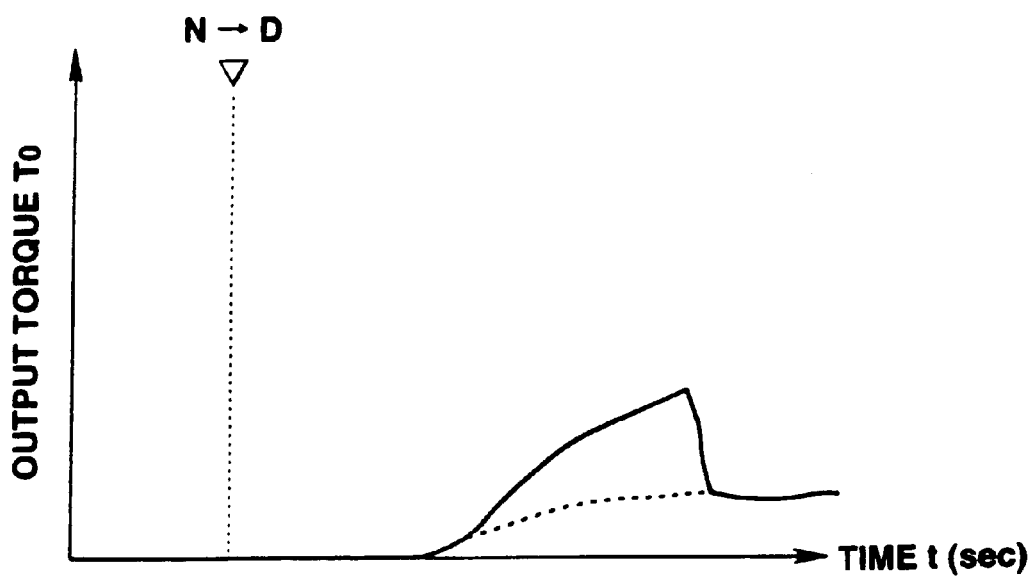
FIG. 26 is a characteristic diagram illustrating a relation between a change in the output torque of the automatic transmission and the time in the control example of FIG. 25.

FIG. 25 is a flow chart showing a control example corresponding to the ninth characteristic construction. FIG. 26 a characteristic diagram illustrating a relation between the output torque of the automatic transmission 2 and the time in the control example of FIG. 25. In this control example, it is decided (at Step 131) the so-called "garage shift" is executed while the hybrid vehicle HV is in the stopped state. The garage shift means that the range of the automatic transmission 2 is switched alternately between the drive (D) range and the reverse (R) range across the neutral (N) range. Incidentally, if the answer of Step 131 is "NO", the routine is returned. If the answer of Step 131 is "YES", on the contrary, the regenerative braking force is established by the motor-generator 9 (at Step 132).

Step 131 corresponds to the first detect means of the present invention, and Step 132 corresponds to the sixth control means of the present invention.

Incidentally, if the answer of Step 131 is "YES", that is, if after the change from the neutral (N) range to the drive (D) range the accelerator pedal is depressed, an abrupt change occurs in the output torque, as indicated by solid curve in FIG. 26, by the chatter or vibration between the transmission mechanism and the torque transmission mechanism of the automatic transmission 2. Moreover, a torque fluctuation (or rolling) occurs at the crankshaft 1A of the engine 1 and at the intermediate shaft 2A of the automatic transmission 2 so that a force is established to vibrate the vehicle in the longitudinal directions.

In this control example, therefore, the regenerative braking force of the motor-generator 9 is established according to the change in the output torque to absorb the change in the torque and the rolling of the counter shaft 2C. As a result, the sum of the torque to be transmitted to the front wheels 7 and 8 and the regenerative braking force to be applied to the rear wheels 14 and 15, that is, the drive force of the vehicle is kept at the value, as indicated by dotted curve. Incidentally, a similar control is also made if the range is switched from the neutral (N) range to the reverse (R) range.

Thus, according to the control example of FIG. 25, even if the forward and reverse runs are repeated to accommodate the hybrid vehicle HV in the garage, the abrupt start and the vibration of the vehicle are prevented to improve the riding comfort and the drivability.

(Fourteenth Control Example)

Figure 27:
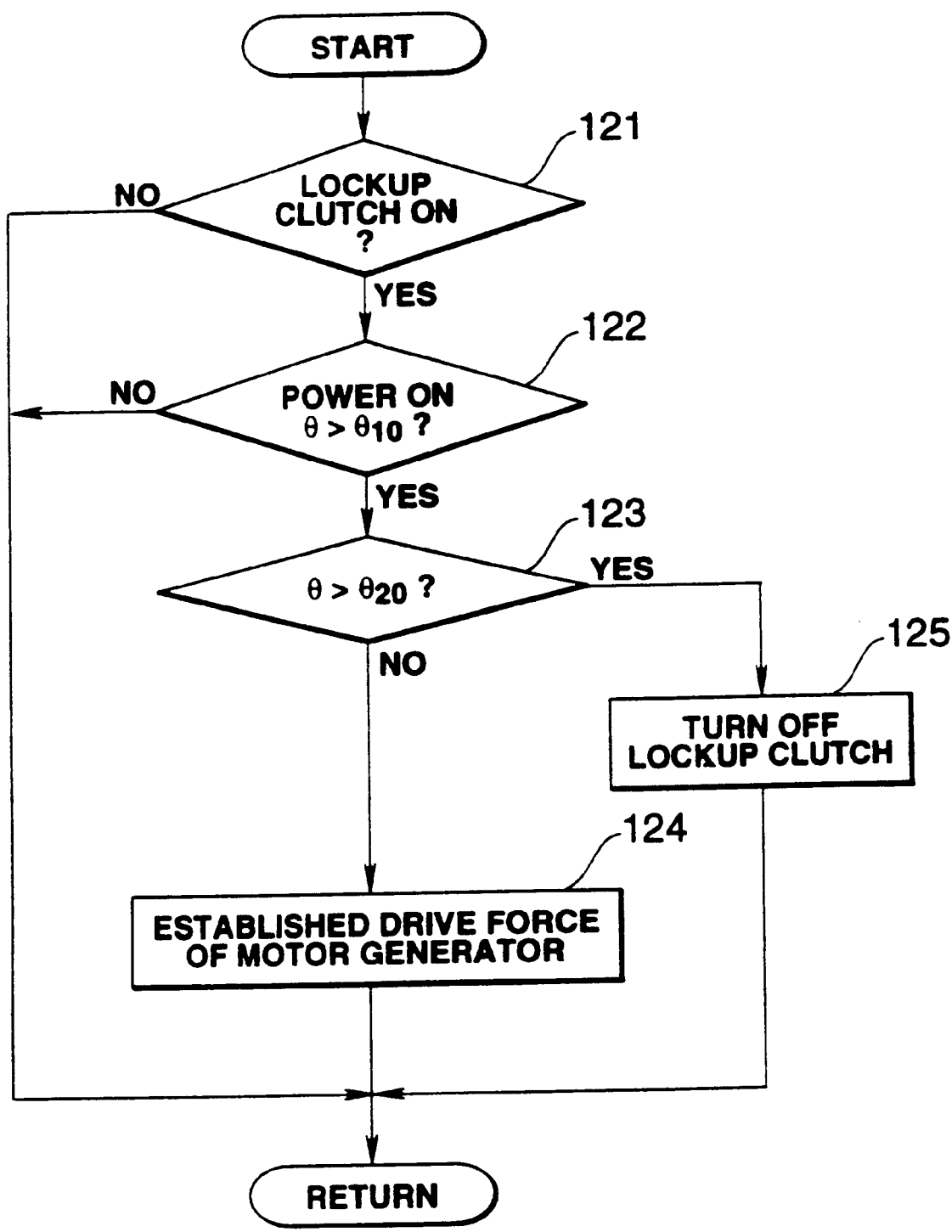
FIG. 27 is a flow chart showing another control example of the hybrid vehicle of the present invention.

FIG. 27 is a flow chart showing a control example corresponding to the tenth characteristic construction. In this control example, while the hybrid vehicle HV is running, it is decided (at Step 121) by the first controller 18 whether or not the lockup clutch 2D of the automatic transmission 2 is ON (applied). If the answer of Step 121 is "YES", it is decided (at Step 122) whether or not the accelerator opening θ is over the value $θ_{10}$ which is stored in advance in the first controller 18. This accelerator opening $θ_{10}$ is at the value to fluctuate the torque of the counter shaft 2C.

If the answer of Step 122 is "YES", it is decided (at Step 123) whether or not the accelerator opening θ is over the value $θ_{20}$ which is stored in advance in the first controller 18. This accelerator opening $θ_{20}$ is at the value to decide whether or not the drive has an intention to accelerate the vehicle.

If the answer of Step 123 is "NO", the driver demands no abrupt acceleration, so that the vehicle is accelerated by adding the output of the motor-generator 9 to the drive force of the vehicle (at Step 124) while keeping the output torque of the engine 1. Incidentally, if the drive force is already outputted from the motor-generator 9, a control is made to increase the drive force.

If the answer of Step 123 is "YES", on the contrary, the torque abruptly changes at the counter shaft 2C of the automatic transmission 2 if the output torque of the engine 1 abruptly rises, so that the vehicle is accelerated with the lockup clutch 2D being OFF (at Step 125).

In short, torque by the torque converter 2B is amplified to raise the accelerating ability. Incidentally, if the answer of Step 121 or 122 is "NO", the routine is returned.

Steps 121 to 123 correspond to the increase demand detecting means of the present invention, and Step 124 corresponds to the seventh control means of the present invention.

Thus, according to the control example of FIG. 25, if a gentle acceleration is demanded, the lockup clutch 2D is controlled in the ON state to keep a mechanically torque transmitting state to improve the fuel economy. Moreover, the vibration is prevented without raising the output torque of the engine 1, and the control is made to add the output of the motor-generator 9 to the drive force of the vehicle thereby to improve the accelerating ability. As a result, the abrupt acceleration/deceleration and vibration are prevented to improve the running performance, the riding comfort and the drivability.

(Fifteenth Control Example)

Figure 28:
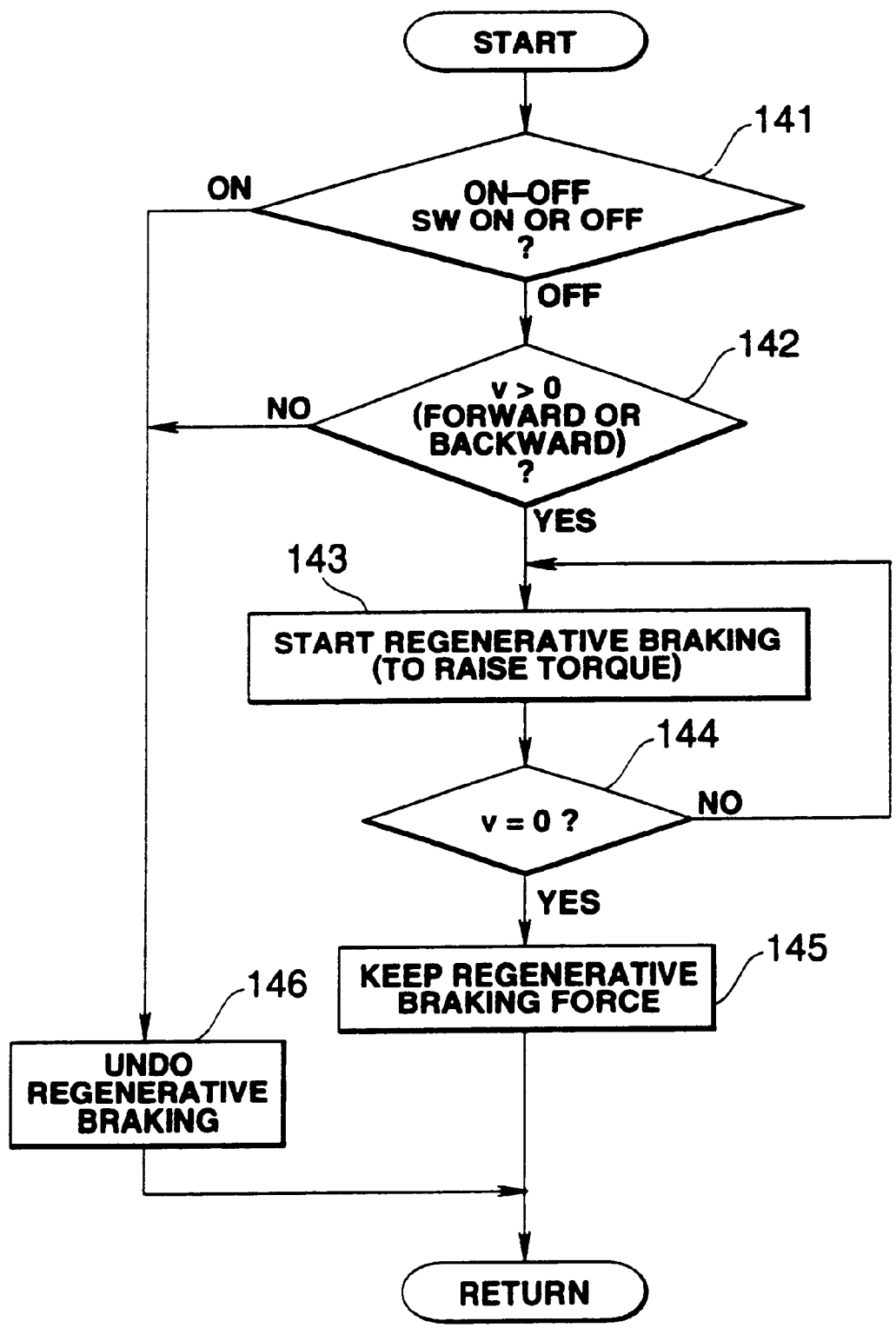
FIG. 28 is a flow chart showing another control example of the hybrid vehicle of the present invention.

FIG. 28 is a flow chart showing a control example corresponding to the eleventh characteristic construction. In this control example, while the vehicle is stopped with the engine 1 being in the idling state, it is decided (at Step 141)

by the first controller 18 whether the creep ON/OFF switch 28 is ON or OFF. If it is detected at Step 141 that the switch 28 is OFF, namely, that the driver intends to stop the hybrid vehicle HV, it is decided (at Step 142) whether the hybrid vehicle HV is running forward or backward at the vehicle speed V.

If the answer of Step 142 is "YES", that is, if the hybrid vehicle HV is gradually moved by the creep torque transmitted through the torque converter 2B, the regenerative braking force of the motor-generator 9 is added to the drive force of the vehicle (at Step 143).

Then, it is decided (at Step 144) whether or not the hybrid vehicle HV is stopped to lower the vehicle speed V to 0. If the answer of Step 144 is "YES", the regenerative braking force is held as it is, to keep the stopped state (at Step 145). Incidentally, if the ON is detected at Step 141 or if the answer of Step 141 is "NO", the regenerative braking of the motor-generator 9 is undone (at Step 146), and the routine is returned. If the answer of Step 144 is "NO", on the contrary, the routine is returned to Step 143, at which the regenerative braking force is further increased.

Step 141 or 142 corresponds to the stop demand detecting means of the present invention, and Steps 143 to 145 correspond to the third brake means of the present invention.

Thus, according to the control example of FIG. 28, if the vehicle is moved by the creep torque outputted through the torque converter 2B while the stop demand is detected, the output of the motor-generator 9 is added as the braking force of the vehicle. As a result, the braking operation by the driver and its frequency are decreased to improve the braking performance and the drivability.

Incidentally, in the control example of FIG. 28, a control could be made to establish the braking force by turning the motor-generator 9 backward from the instant when the demand for stopping the vehicle is detected. Another control could be made to increase the braking force by turning the motor-generator 9 backward from the instant when the vehicle is stopped by the regenerative braking force of the motor-generator 9.

(Sixteenth Control Example)

Figure 29:
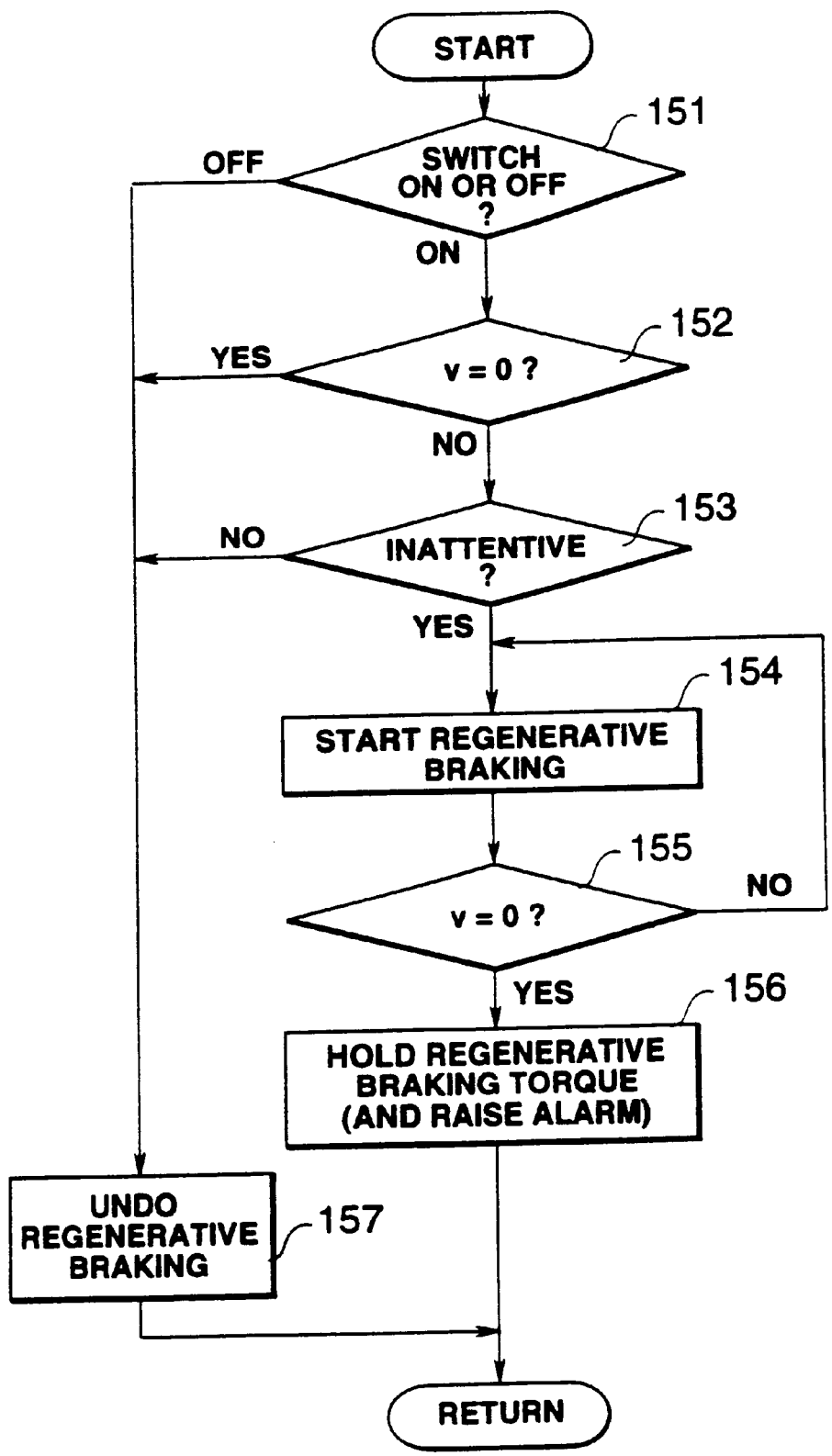
FIG. 29 is a flow chart showing another control example of the hybrid vehicle of the present invention.

FIG. 29 is a flow chart showing a control example corresponding to the eleventh or twelfth characteristic construction. In this control example, while the hybrid vehicle HV is stopped with the engine 1 being in the idling state, it is decided (at Step 151) by the first controller 18 whether the creep ON/OFF switch 28 is ON or OFF. If the answer of Step 151 is "ON", that is, if it is detected that the driver's intention is to move the hybrid vehicle HV gradually, it is decided (at Step 152) whether or not the vehicle speed V is 0 (i.e., the stopped state).

If the answer of Step 152 is "NO", that is, if the vehicle is gradually moved by the creep phenomenon, it is decided (at Step 153) whether or not the driver is inattentive. This decision is made by the signal of the inattention monitor camera 29 or the like. If the answer of Step 153 is "YES", the braking force is established by the motor-generator 9 (at Step 154) so that the distance between the vehicle and the surrounding obstruction is prevented from becoming short.

It is then decided (at Step 155) by the first controller 18 whether or not the vehicle is stopped to lower the vehicle speed to 0. If the answer of Step 155 is "YES", the regenerative braking force is held as it is, and the alarm is raised to stop the driver's inattention (at Step 156).

If the answer of Step 155 is "NO", on the contrary, the routine is returned to Step 154 so that the regenerative braking force is further increased. Incidentally, if the OFF is detected at Step 151, if the answer of Step 152 is "NO" or if the answer of Step 153 is "NO", the regenerative braking is undone (at Step 157), and the routine is returned.

Steps 151 to 153 correspond to the stop demand detecting means of the present invention, and Steps 154 to 156 correspond to the third braking means of the present invention.

Thus, according to the control example of FIG. 29, even when the intention of the driver is to move the vehicle forward or backward gradually by the creep phenomenon, the distance from a surrounding vehicle or obstruction can be kept, if the driver is inattentive, by stopping the vehicle with the regenerative braking force of the motor-generator 9. As a result, the braking operation of the driver and its frequency are decreased to improve the braking performance and the drivability. If the driver is inattentive, moreover, the alarm is raised to warn so that the drivability is further improved.

Incidentally, in the control example of FIG. 29, a control could be made to establish the braking force by turning the motor-generator 9 backward from the instant when the stop demand of the vehicle is detected. Another control could also be made to increase the braking force by turning the motor-generator 9 backward from the instant when the vehicle is stopped by the regenerative braking force of the motor-generator 9.

(Seventeenth Control Example)

Figure 30:
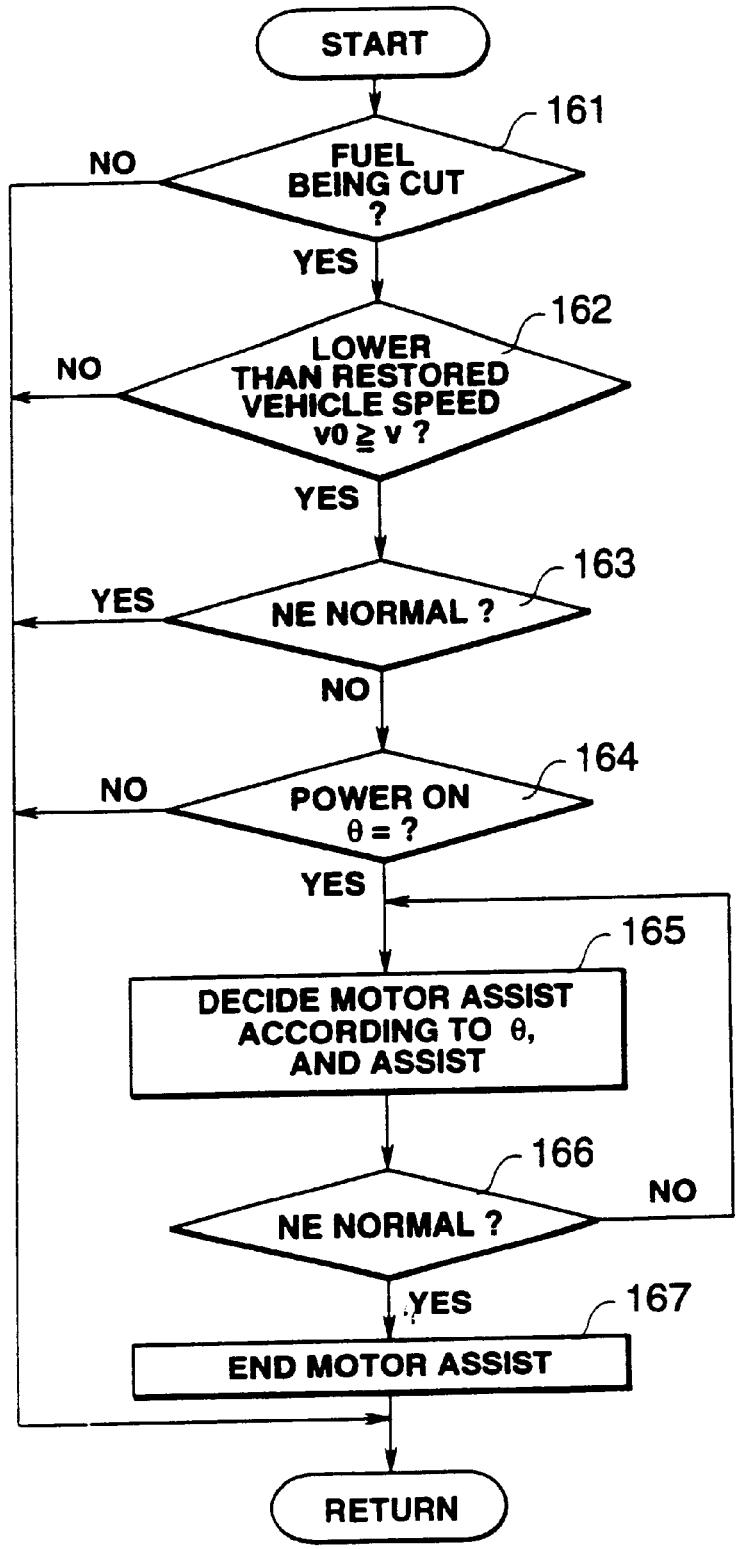
FIG. 30 is a flow chart showing another control example of the hybrid vehicle of the present invention.

FIG. 30 is a flow chart showing a control example corresponding to the thirteenth characteristic construction. In this control example, while the vehicle is running with the engine 1 in the driven state, it is decided (at Step 161) by the first controller 18 whether or not the fuel cutting is being executed. This fuel cutting is the well-known control which is executed when the vehicle is to be decelerated with the throttle valve of the engine 1 being fully closed. In short, the feed of the fuel to the combustion chamber of the engine 1 is blocked on the basis of the opening of the throttle valve and the RPM of the engine 1 thereby to prevent the overheat of the catalyzer and economize the fuel.

If the answer of Step 161 is "YES", it is decided (at Step 162) by the first controller 18 whether or not the vehicle speed V to be detected by the vehicle speed sensor 22 is below the restoration level $V_0$. If the answer of Step 162 is "YES", it is decided (at Step 163) by the first controller 18 whether or not the engine RPM NE of the engine 1 is normal.

Here, the decision of whether or not the RPM of the engine 1 is normal is made, for example, by detecting whether or not the combustion chamber of the engine 1 is in the explosive state, that is, whether or not one of the cylinders of the engine 1 is timed for the explosion to enable to keep the force to raise the engine RPM at the later power ON, i.e., at the time of changing the fuel shutting state to the fuel feeding state. Incidentally, it is possible to predict by the calculation of the first controller 18 whether or not the force to raise the engine RPM after the power ON can be kept.

If the rotating state of the engine 1 is in the rough-idle state just before the stalling of the engine, the answer of Step 163 is "NO". With this "NO" answer of Step 163, it is decided (at Step 164) by the first controller 18 whether or not the accelerator pedal is depressed for the power ON by the driver. In other words, it is decided whether or not the state of the engine 1 is changed from the fuel shut state to the fuel fed state of the combustion chamber.

If the answer of the Step 164 is "YES", the value of the drive force to assist the drive force of the engine 1 in accordance with the throttle opening θ is calculated by the first controller 18. Then, the drive force thus calculated is outputted from the motor-generator 9 to assist the drive force of the engine 1 (at Step 165).

After this, it is decided (at Step 166) by the first controller 18 whether or not the RPM NE of the engine 1 becomes normal. If the answer of Step 166 is "YES", the assist of the drive force by the motor-generator 9 is ended (at Step 167). If any of the answers of Steps 161, 162 and 164 is "NO" or if the answer of Step 163 is "YES", the drive force of the engine 1 need not be assisted so that it is not assisted by the motor-generator 9, and the routine is returned.

If the answer of Step 166 is "NO", on the contrary, the drive force of the engine 1 is short, and the routine is returned to Step 165 so that the assist of the drive force by the motor-generator 9 is continued.

Steps 161 to 164 correspond to the fuel detecting means of the present invention, and Steps 165 and 166 correspond to the eighth control means of the present invention.

Thus, according to the control example of FIG. 30, when the fuel shutting state of the engine 1 is changed to the fuel feeding state, the control is made to assist the short drive force of the engine 1, as caused by the delay in the explosion timing of the combustion chamber, with the drive force of the motor-generator 9. As a result, the accelerating ability of the hybrid vehicle HV is improved to improve the running performance and the drivability.

Incidentally, if the engine 1 has a construction of variable cylinder type, the mode for changing the shut state to the fed state of the fuel is exemplified by the following the modes. Specifically: the mode in which all the cylinders are changed from the shut state to the fed state of the fuel; and the mode in which some of the cylinders are changed from the shut state to the fed state of the fuel. If the engine 1 has a construction of bank switching type, on the other hand, the mode for changing the shut state to the fed state of the engine 1 is exemplified by the mode in which the running state of one bank is changed to the running state of two banks.

Figure 31:
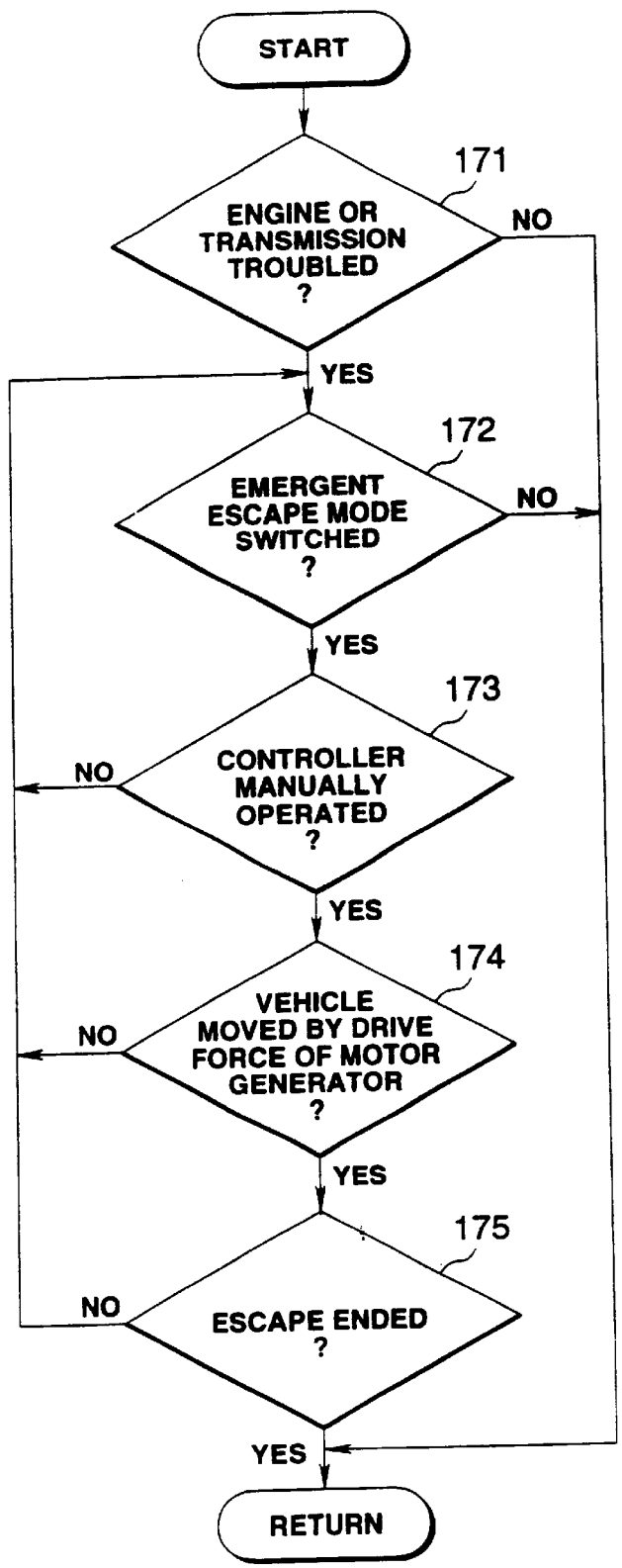
FIG. 31 is a flow chart showing another control example of the hybrid vehicle of the present invention.

FIG. 31 is a flow chart showing another control example of the present invention. According to this control example, while the hybrid vehicle HV is running or stopped, it is decided (at Step 171) by the first controller 18 whether or not the engine 1 or the automatic transmission 2 is troubled into failure to run. This trouble is exemplified by a trouble in the fuel system or intake system of the engine 1 or by a trouble in the hydraulic circuit of the automatic transmission 2. If any of these troubles is detected, it is alarmed that the vehicle cannot be run by the drive force of the engine 1.

If the answer of Step 171 is "YES", it is decided (at Step 172) whether or not the running mode has been changed from the prevailing mode to an emergent escape mode. This change is made automatically by the first controller 18 or manually by the driver.

If the answer of Step 172 is "YES", it is decided (at Step 173) whether or not the second battery 16 and the starting motor 44 are connected by the manual operation of the second controller 46. If the answer of Step 173 is "YES", it is decided (at Step 174) whether or not the hybrid vehicle HV is started by the drive force of the motor-generator 9 while being not driven by the engine 1.

If the answer of Step 174 is "YES", it is decided (at Step 175) whether or not the own vehicle has escaped after a predetermined time to a place exerting no influence upon the running of another vehicle. This decision is made with reference to the action of the parking brake, for example, while the hybrid vehicle HV is in the stopped state. Incidentally, if the answer of Step 171 or 172 is "NO", the routine is returned. If the answer of Steps 173, 174 or 175 is "NO", the routine is returned to Step 172.

Thus, according to the control example of FIG. 31, even if the engine 1 or the automatic transmission 2 is troubled so that the hybrid vehicle HV cannot be run by the drive force of the engine 1, this car can be run by the drive force of the motor-generator 9.

Figure 32:
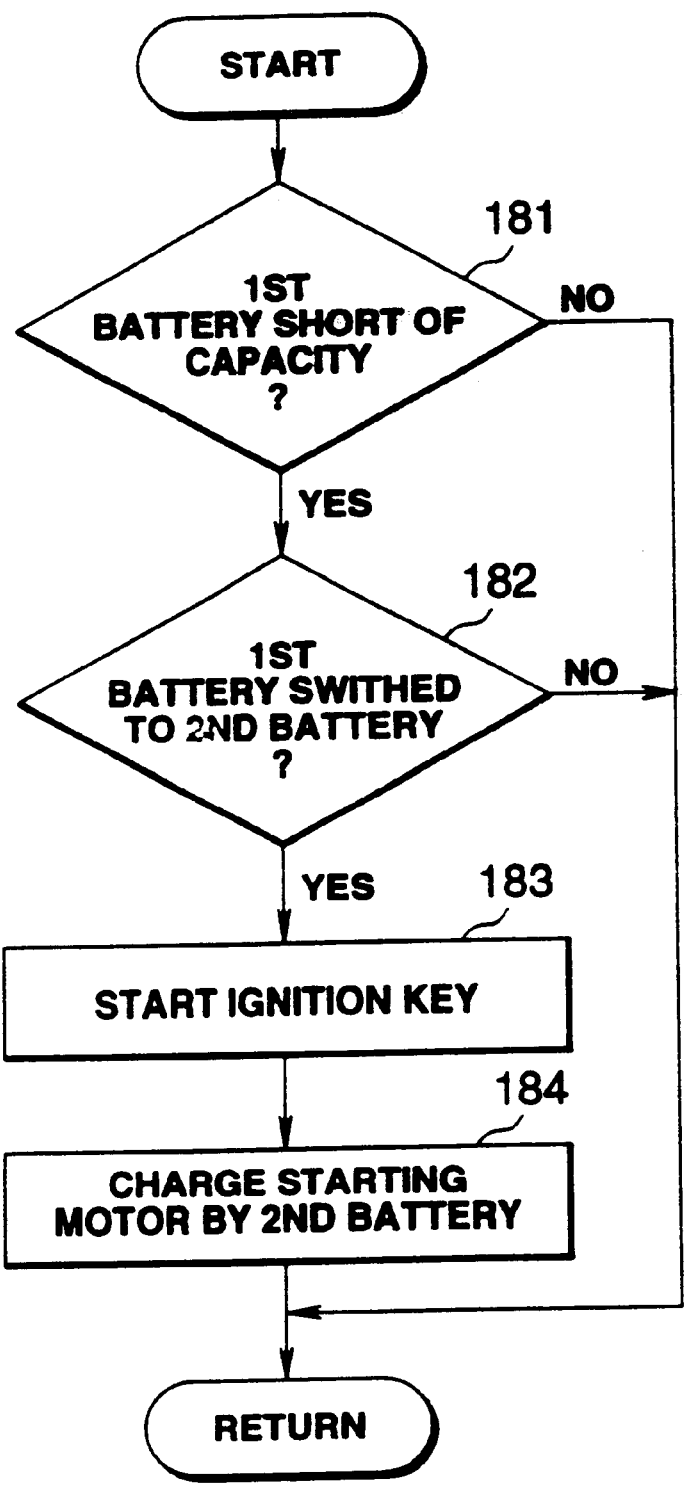
FIG. 32 is a flow chart showing another control example of the hybrid vehicle of the present invention.

FIG. 32 is a flow chart showing still another control example of the present invention. In this control example, the capacity (or voltage) of the first battery 43 is detected by the second controller 46. It is then decided (at Step 181) whether or not the starting motor 44 cannot be activated due to shortage of the capacity of the first battery 43.

If the answer of Step 181 is "YES", it is decided (at Step 182) whether or not the starting motor 44 and the second battery 16 are connected by the (not-shown) switch. If the answer of Step 182 is "YES", when the ignition key is turned ON by the driver (at Step 183), the power is supplied from the second battery 16 to the starting motor 44 (at Step 184) to activate the starting motor 44. Incidentally, the voltage of the second battery 16 is transformed by the transformer 45 to adjust the RPM of the engine 1. Incidentally, if the answer of Step 181 or 182 is "NO", the routine is returned.

Thus, according to the control example of FIG. 32, if the capacity of the first battery 43 becomes short, a control is made to supply the starting motor 44 with the DC current of the second battery 16 so that the engine 1 can be troublelessly started to run the vehicle.

Incidentally, the control example of FIGS. 3, 5, 6, 7, 19, 30, 31 or 32 in the present invention can also be applied to a hybrid vehicle using a selective gear transmission or a transmission of sliding meshing type, always meshing type or synchronous meshing type in place of the automatic transmission 2.

Moreover, the control example, as shown in FIGS. 7, 8, 12, 14, 16, 17, 19, 22, 25, 27, 28, 29, 31 or 32, can also be applied to a hybrid vehicle employing another prime mover such as an electric motor system, a flywheel system, a gas turbine system or a fuel cell system in place of the engine 1.

Moreover, the control example, as shown in FIGS. 8, 12, 14, 16, 17, 19, 22, 25, 27, 30, 31 or 32, can also be applied to a hybrid vehicle employing another prime mover such as an electric motor having only a power running function, a hydraulic motor, a flywheel system or a gas turbine in place of the motor-generator 9.

Still moreover, the present invention may employ a plurality of prime movers of the same kind or combine prime movers of different kinds. Moreover, the method of connecting the individual prime movers can adopt either a tandem type or a parallel type.

As the drive type of the hybrid vehicle, moreover, there may be adopted a four-wheel drive car of the construction in which the drive forces of the individual prime movers are transmitted to all wheels, a four-wheel drive car of the construction in which the drive forces of the individual prime movers are applied to different wheels, or a two-wheel drive car of the construction in which the drive forces of the individual prime movers are transmitted exclusively to some wheels. The drive type of the four-wheel drive car may be of part time or full time.

Here will be exemplified other modes of embodiment and additional constructions including the respective characteristic constructions of the present invention. The second braking means in the hybrid vehicle, as provided with the second characteristic construction of the present invention, need not keep the distance L between the own vehicle and another vehicle constant, if the distance L is over the predetermined value $L_0$. On the other hand, the second braking means can make a control to establish the regenerative braking force of the motor-generator independently of the distance between vehicles at the instant when a surrounding vehicle is detected.

Moreover, the obstruction detecting means in the hybrid vehicle, as provided with the second characteristic construction of the present invention, can detect a building, a tree or a person. By the second braking means, moreover, a control can be made to keep the distance between the hybrid vehicle and the building, the tree or the person at a constant value or more.

The first control means in the hybrid vehicle, as provided with the fourth characteristic construction of the present invention, is enabled to improve the accelerating ability by suppressing the output torque of the engine at the starting or accelerating time of the hybrid vehicle and by making a control to assist the shortage of the output torque with the drive force of the motor-generator.

In the hybrid vehicle having the fifth characteristic construction, the second control means can establish the drive force of the motor-generator at a steep gradient from the output torque at a high gear stage of the automatic transmission and can control the drive force of the motor-generator so that the output torque may gently shift to the output torque at a low gear stage.

In the having the fifth characteristic construction, moreover, the second control means can control the drive force of the motor-generator so that the output torque at a high gear stage of the automatic transmission may shift at a constant rate Be, to the output torque at a low gear stage. The second control means can also establish or increase the drive force of the motor-generator at a instant when a running state of shifting down the automatic transmission is detected, that is, before a high gear stage clutch is released.

In the hybrid vehicle having the fifth characteristic construction, the second control means can control the drive force of the motor-generator in a power mode, if set, to a larger value in another running mode. So long as the power mode is set, moreover, the second control means can make a control to output or increase the drive force of the motor-generator.

In the hybrid vehicle having the sixth characteristic construction, the third control means can make a control to add the output of the motor-generator to the drive force of the vehicle while the vehicle is in the running state in which the upshift and downshift of the automatic transmission are repeated for a predetermined time period.

In the hybrid vehicle having the eleventh characteristic construction, the third braking means can also make a control to establish the braking force by turning the motor-generator backward from the instant when the stop demand of the vehicle is detected. Moreover, the third braking means can also make a control to increase the braking force by turning the motor-generator backward from the instant when the vehicle is stopped by the regenerative braking force of the motor-generator.

What is claimed is:

1. A hybrid vehicle (HV) for assisting the drive force or braking force, when it is run by the output of a first prime mover, with the drive force or braking force of a second prime mover to be controlled independently of said first prime mover, said hybrid vehicle (HV) including an automatic transmission connected to the output side of one prime mover for changing gear stages on the basis of a running state, comprising:

a first drive shaft driven by the first prime mover;

a second drive shaft driven by the second prime mover;

upshift detecting means for detecting an upshift by said automatic transmission during which the engine torque increases; and control means for adding the output of the prime mover, as different from the prime mover connected to said automatic transmission, during the upshift to the drive force of said hybrid vehicle (HV).

2. A hybrid vehicle comprising:

a first prime mover;

an automatic transmission connected to an output side of the first prime mover for changing gear stages on a basis of a running state of the hybrid vehicle, wherein the first prime mover is connected to drive one of the front and rear wheels of the vehicle via the automatic transmission;

a second prime mover connected to drive an other of the front and rear wheels of the hybrid vehicle;

an upshift detector adapted to detect an upshift by said automatic transmission, wherein an output torque of said automatic transmission, and a torque at the one of the front and rear wheels, fluctuates during the upshift; and control means for controlling an output of the second prime mover, in accordance with an upshift being detected by said upshift detector, to vary an output torque of the second prime mover such that a torque at the other of the front and rear wheels fluctuates in a sense opposite fluctuations in the torque at the one of the front and rear wheels.

* * * * *